US012729884B2

(12) United States Patent
Strange

(10) Patent No.: US 12,729,884 B2
(45) Date of Patent: Sep. 8, 2026

(54) SYSTEM AND METHODS FOR ENHANCED THERMAL SYPHONING

(71) Applicant: GOOD WATER ENERGY LTD., Claremont (AU)

(72) Inventor: Warren Ross Strange, Claremont (AU)

(73) Assignee: GOOD WATER ENERGY LTD., Claremont (AU)

(*) Notice: Subject to any disclaimer, the term of this patent is extended or adjusted under 35 U.S.C. 154(b) by 398 days.

(21) Appl. No.: 18/017,359

(22) PCT Filed: Jul. 12, 2021

(86) PCT No.: PCT/AU2021/050743
§ 371 (c)(1),
(2) Date: Jan. 20, 2023

(87) PCT Pub. No.: WO2022/016210
PCT Pub. Date: Jan. 27, 2022

(65) Prior Publication Data

US 2023/0296290 A1 Sep. 21, 2023

(30) Foreign Application Priority Data

Jul. 24, 2020 (AU) ................................ 2020902587

(51) Int. Cl.
*F24T 10/40* (2018.01)
*F24T 10/00* (2018.01)
(Continued)

(52) U.S. Cl.
CPC .............. *F24T 10/40* (2018.05); *F24T 10/17* (2018.05); *F24T 10/20* (2018.05); *F24T 2010/56* (2018.05); *Y02E 10/10* (2013.01)

(58) Field of Classification Search
CPC ........ E21B 34/025; E21B 43/12; F24T 10/40; F24T 10/17; F24T 10/20; F24T 2010/56; F28D 1/0226; Y02E 10/10
See application file for complete search history.

(56) References Cited

U.S. PATENT DOCUMENTS 2,438,720 A * 3/1948 Smith .................. E21B 36/003 165/110
2,461,449 A * 2/1949 Smith .................... F24T 10/30 166/57
(Continued)

FOREIGN PATENT DOCUMENTS

AU 2022331631 A1 * 3/2024 ............. F24T 10/40
DE 2113341 A1 * 11/1971
(Continued)

OTHER PUBLICATIONS

International Search Report for related International Application No. PCT/AU2021/050743; action dated Jan. 27, 2022; (4 pages).
(Continued)

*Primary Examiner* — Ljiljana V. Ciric
(74) *Attorney, Agent, or Firm* — K&L Gates LLP

(57) ABSTRACT

A thermal syphoning system comprising a first well and a second well extending though a permeable geological layer, each well having: an inlet channel to introduce a fluid into the well and an inlet valve to control an inlet fluid flow rate into the inlet channel; an outlet channel to draw the fluid when geologically heated from the well and an outlet valve to control an outlet fluid flow rate from the outlet channel; and an opening in the inlet channel adjacent the permeable geological layer, wherein the inlet channel of the first well and the inlet channel of the second well are in fluid communication with each other such that the inlet channels receive heated fluid from each other via the permeable geological layer and through the openings in the inlet
(Continued)

channels, wherein each inlet valve and each outlet valve can be adjusted to vary a flow volume.

14 Claims, 7 Drawing Sheets

(51) Int. Cl.
*F24T 10/17* (2018.01)
*F24T 10/20* (2018.01)

(56) References Cited

U.S. PATENT DOCUMENTS 2,584,605 A * 2/1952 Merriam .............. E21B 43/247 166/266
2,695,163 A * 11/1954 Pearce ................. E21B 43/247 166/266
2,780,449 A * 2/1957 Fisher .................. E21B 43/243 166/260
2,901,043 A * 8/1959 Campion ............. E21B 43/243 166/260
2,911,206 A * 11/1959 Purre ..................... E21C 41/24 299/2
2,930,598 A * 3/1960 Parker .................. E21B 43/243 166/257
2,962,095 A * 11/1960 Morse .................. E21B 43/247 166/280.1
3,000,441 A * 9/1961 Kunetka .............. E21B 43/243 166/261
3,044,545 A * 7/1962 Tooke .................. E21B 43/243 166/260
3,072,187 A * 1/1963 Carr ..................... E21B 43/247 208/400
3,154,142 A * 10/1964 Latta .................... E21B 43/243 166/250.15
3,195,632 A * 7/1965 Henderson ........... E21B 43/247 166/259
3,283,814 A * 11/1966 Schlicht ............... E21B 43/243 166/259
3,330,356 A * 7/1967 Hottman ................ E21B 43/24 166/57
3,332,489 A * 7/1967 Morse .................. E21B 43/243 166/256
3,342,258 A * 9/1967 Prats .................... E21B 43/247 166/259
3,599,714 A * 8/1971 Messman ............. E21B 43/247 166/266
3,630,278 A * 12/1971 Parker ................ E21B 43/2635 166/259
3,679,264 A * 7/1972 Van Huisen ........... E21B 43/24 165/45
3,765,477 A * 10/1973 Van Huisen ........... F24T 10/20 976/DIG. 425
3,864,208 A * 2/1975 Van Huisen ........ E21B 43/2403 376/324
3,957,108 A * 5/1976 Van Huisen ........... F03G 4/074 165/45
3,997,004 A * 12/1976 Wu ...................... E21B 43/168 166/250.15
4,044,830 A * 8/1977 Van Huisen ........... F24T 10/20 165/45
4,051,677 A * 10/1977 Van Huisen ........... F24T 10/30 165/45
4,054,176 A * 10/1977 Van Huisen ........... F03G 4/074 165/45
4,060,988 A * 12/1977 Arnold ................. E21B 43/267 165/45
4,094,356 A * 6/1978 Ash ........................ F24T 10/30 165/45
4,138,995 A * 2/1979 Yuan .................. F28D 15/0233 126/400
4,157,730 A * 6/1979 Despois .............. F28D 20/0056 165/45
4,201,060 A * 5/1980 Outmans ................ F24T 10/30 165/45
4,211,613 A * 7/1980 Meckler ............... E21B 43/281 299/5
4,220,202 A 9/1980 Aladiev et al.
4,299,270 A * 11/1981 McGrath ............ F28D 20/0052 165/104.31
4,325,357 A * 4/1982 Wormser ............. F24F 5/0046 126/610
4,343,999 A * 8/1982 Wolf ...................... F03G 4/074 60/641.2
4,384,613 A * 5/1983 Owen .................. E21B 43/305 166/256
4,392,531 A * 7/1983 Ippolito ................. F03G 4/074 166/278
4,448,237 A * 5/1984 Riley ................. F24D 11/0214 165/45
4,466,256 A * 8/1984 MacCracken ....... F28D 20/0052 126/400
4,522,254 A * 6/1985 Koizumi ............ F28D 20/0039 165/104.19
4,577,679 A * 3/1986 Hibshman .......... F28D 20/0052 165/45
4,886,119 A * 12/1989 Bernhardt .............. B09C 1/005 166/267
4,912,941 A * 4/1990 Buchi .................... F03G 4/074 165/45
5,176,164 A * 1/1993 Boyle ................ E21B 43/1235 137/155
5,620,049 A * 4/1997 Gipson ................ E21B 43/267 507/924
5,937,934 A * 8/1999 Hildebrand ............ F24T 10/20 165/DIG. 228
6,073,448 A * 6/2000 Lozada .................. F03G 4/074 60/641.1
6,932,155 B2 * 8/2005 Vinegar ............... E21B 43/168 166/302
6,991,045 B2 * 1/2006 Vinegar ............. E21B 43/2401 175/45
7,059,131 B2 * 6/2006 Hildebrand ............ F24T 10/17 60/641.2
7,066,257 B2 * 6/2006 Wellington ............. C10G 9/24 166/272.2
7,077,198 B2 * 7/2006 Vinegar .................... B09C 1/06 166/250.12
7,086,465 B2 * 8/2006 Wellington .......... E21B 43/168 166/279
7,165,615 B2 * 1/2007 Vinegar .................... B09C 1/02 392/301
7,201,221 B2 * 4/2007 Tubel .................... G01D 5/268 166/250.01
7,461,691 B2 * 12/2008 Vinegar .................. G01V 3/26 166/60
7,490,657 B2 * 2/2009 Ueyama ................. F24T 10/20 165/45
7,753,122 B2 * 7/2010 Curlett ................... F03G 4/074 166/305.1
7,832,220 B1 * 11/2010 Wiggs .................... F24T 10/15 62/260
8,109,094 B2 * 2/2012 Petty ...................... F24T 10/20 60/641.2
8,650,875 B2 * 2/2014 Wiggs .................... F24T 10/30 60/641.2
8,789,587 B2 * 7/2014 Tubel ................... E21B 47/017 166/266
9,039,327 B2 * 5/2015 McAlister .............. F24T 10/10 405/130
9,085,412 B1 * 7/2015 Sasakura ............ F24D 11/0221
9,222,704 B2 * 12/2015 McAlister .............. H01L 21/30
9,267,354 B2 * 2/2016 Watson .................. E21B 43/14
9,284,952 B2 * 3/2016 Peele ...................... F28F 21/06
9,394,771 B2 * 7/2016 Wiggs .................... F03G 4/074
9,518,787 B2 * 12/2016 Pilebro .............. F28D 20/0034
9,657,998 B2 * 5/2017 Pilebro .............. F24D 19/1066

(56) References Cited

U.S. PATENT DOCUMENTS 9,709,337 B2 * 7/2017 Pilebro ............... F28D 20/0052
10,100,625 B2 * 10/2018 Barak ................... E21B 43/243
10,641,073 B2 * 5/2020 Curlett .................... E21B 28/00
11,473,813 B2 * 10/2022 Alharbi ................... F24T 10/30
11,549,761 B1 * 1/2023 Ho ...................... F28D 20/0052
11,796,225 B2 * 10/2023 Suver ...................... F24T 10/17
12,000,384 B2 * 6/2024 Steele ..................... E21B 43/14
2002/0027004 A1 * 3/2002 Bussear ................ E21B 47/107
166/250.15
2008/0073058 A1 * 3/2008 Ueyama .................. F24T 10/30
165/45
2008/0128108 A1 * 6/2008 Clark ...................... F24T 10/10
165/45
2012/0098277 A1 * 4/2012 Petty ....................... F24T 10/20
165/45
2012/0132393 A1 * 5/2012 Pilebro ............... F28D 20/0043
165/45
2012/0144829 A1 * 6/2012 Wiggs ..................... F24T 10/30
60/641.2
2013/0068418 A1 * 3/2013 Gotland .................. F28D 19/00
165/45
2013/0101492 A1 * 4/2013 McAlister ................. C01B 3/24
422/162
2015/0292810 A1 * 10/2015 Pilebro ............... F28D 20/0052
165/10
2015/0300327 A1 10/2015 Sweatman et al.
2020/0011573 A1 * 1/2020 Graham .................. F24T 10/17
2023/0296290 A1 * 9/2023 Strange ................... F24T 10/17
165/45
2024/0093881 A1 * 3/2024 Peele ........................ F24D 3/18
2024/0369264 A1 * 11/2024 Strange ................... F03G 4/001
2025/0230731 A1 * 7/2025 Strange ............... E21B 41/0064

FOREIGN PATENT DOCUMENTS

GB 1326458 A * 8/1973 ........... E21B 43/305
JP 2004271129 A * 9/2004 .............. F24T 10/15
JP 2005207718 A * 8/2005 .............. F24T 10/20
JP 4594956 B2 * 12/2010 .............. F24T 10/15
JP 2015212593 A * 11/2015 .............. F24T 10/20
JP 6529151 B2 * 6/2019 .............. F24T 10/20
JP 2020176745 A * 10/2020
KR 20100114243 A * 10/2010 ............ F24F 5/0046
RU 2483255 C1 * 5/2013
SU 322084 A1 * 10/1973 ............. E21B 43/24
SU 1721410 A1 * 3/1992
WO WO-2009135073 A2 * 11/2009 .............. F24T 10/20
WO WO-2012107470 A1 * 8/2012 .............. F03B 13/06
WO WO-2020059788 A1 * 3/2020 ................ F24F 5/00
WO WO-2022129978 A1 * 6/2022 ........... E21B 49/008
WO WO-2023087064 A1 * 5/2023 ......... E21B 41/0064
WO WO-2024126875 A1 * 6/2024 ......... E21B 41/0085

OTHER PUBLICATIONS

Written Opinion for related International Application No. PCT/AU2021/050743; action dated Jan. 27, 2022; (4 pages).

* cited by examiner 100
110
112
114
116
118
120
122
124
126
128
130
132
134
136
138
140
142
144
146
148
150
152
154
156
158
160
162
164
166
168
170
172
174
176
178
180
182
184
188
190
192
194
104
106
108
10
20
30
40
50
60
70
80
90

SYSTEM AND METHODS FOR ENHANCED THERMAL SYPHONING

CROSS-REFERENCE TO RELATED APPLICATIONS

This application is the National Stage filing under 35 U.S.C. 371 of International Application No. PCT/AU2021/050743, filed on Jul. 12, 2021, which claims the benefit of earlier filing date and right of priority to Australian Application No. 2020902587 filed on Jul. 24, 2020, the contents of which are all hereby incorporated by reference herein in their entirety.

BACKGROUND

Wellbores are often provided with separate multiple flow channels for moving fluids into and out of subsurface reservoirs. For example, a single injection well may be required to provide injection fluids to two or more layers in a reservoir in which case two separate flow channels are required. In other arrangements, a single wellbore may be used to provide both a means for producing fluid from a reservoir and also provide a supply and return conduit for supplying a working fluid to a subsurface device. One way of separating the flow channels is to use separate tubing strings in parallel and placed into a single wellbore. While these arrangements are useful for shallow wells having low flow rates, they are impractical for wells having higher flow rates or deep wells where pressure drops caused by the required narrow tubing strings are unacceptable.

Geothermal power is at least an order of magnitude greater than all fossil fuels combined. A problem with geothermal power is the difficulty of creating a sufficient flow of hot water, from an injection well through the rock structure, then out of a production well. Because the heat transfer coefficient of rock formations is generally low, the water must be forced through a series of small cracks in a fractured zone to maximize the surface area from which the requisite heat can be drawn. Closed-loop systems can be used in ground-source heat pump geothermal applications. Typically, either a vertical well is drilled and pipes run down the bore, or a system of coils is laid in a horizontal arrangement, and embedded into an excavation near a building to which the heat is to be supplied.

SUMMARY

The present disclosure relates to an enhanced thermal syphoning system. In some embodiments the system uses a plurality of open configuration wells. In some embodiments the system uses a combination of open and closed configuration wells. An open configuration well is one where the fluid traveling into and out of the well can be exposed to the surrounding geology and may be contaminated, in a positive or negative manner by the minerals and salts in the surrounding geometry. A closed configuration well is one where the fluid or alternative fluid medium travelling into and out of the well is sealed and not exposed to the surrounding geology. The closed well can deliver thermal energy draw from the hot geology at the bottom of the well; however, the fluid or alternative heat transfer medium within the closed well remains uncontaminated from the hot geology at the bottom of the well.

In a first aspect, the disclosure provides an enhanced thermal syphoning system, comprising a first well and a second well extending though a permeable geological layer, each well having: an inlet channel to introduce a fluid into the well and an inlet valve to control an inlet fluid flow rate into the inlet channel; an outlet channel to draw geologically heated fluid from the well and an outlet valve to control an outlet fluid flow rate from the outlet channel; and an opening in the inlet channel adjacent the permeable geological layer wherein fluid in the inlet channel of the first well and the inlet channel of the second well is communicated therebetween via the permeable geological layer, the fluid entering and exiting the inlet channels through the openings therein, such that each inlet and each outlet valve can be adjusted to vary a flow volume of the fluid between the first well and the second well to thereby control a temperature of the heated fluid drawn from each well.

In some embodiments, the system may further comprise at least one supplementary well located between the first and the second well, the supplementary well comprising: an inlet channel to introduce fluid into the supplementary well and an inlet valve to control an inlet fluid flow rate into the inlet channel; an outlet channel to draw geologically heated fluid from the supplementary well and an outlet valve to control an outlet fluid flow rate from the outlet channel; and an opening in the inlet channel, wherein the opening in the inlet channel of the supplementary well is located in the permeable geological layer and configured to receive a portion of the fluid communicated between the first well and the second well In some embodiments, the system may further comprise at least one supplementary well located between the first and the second well, the supplementary well comprising: a sealed inlet channel to introduce a fluid medium into the supplementary well and an inlet valve to control an inlet fluid medium flow rate into the inlet channel; an outlet channel to draw geologically heated fluid medium from the supplementary well and an outlet valve to control an outlet fluid medium flow rate from the outlet channel, wherein a portion of the inlet channel of the supplementary well is located in the permeable geological layer such that the heated fluid communicated between the first well and the second well flows across the portion of the inlet channel to dissipate heat to the fluid medium therein.

The inlet channel of each well may be at least partially bounded by a casing. The inlet channel of each well may be at least partially bounded by a geological wall of the well. The inlet channel of each well may be supported at a surface of each respective well. The inlet channel of each well may comprise a plurality of concentric nested casings, each subsequent casing extending further into the respective well. The inlet channel of each well may be longer than the outlet channel of each well to thereby form a gap toward a base of each well. The opening of each inlet channel may be configured as a permeable portion of the casing.

The outlet channel of each well may be cylindrical and co-axially located within the casing or geological wall of the inlet channel of the respective well. Each outlet channel may comprise an intake screen that filters the fluid flow from the permeable geological layer before the fluid enters each of the respective outlet channels.

In some embodiments, the system may comprise between three and ten wells, the wells arranged in series. In some embodiments, the system may comprise between three and ten wells, the wells arranged in formation about a central well.

In a second aspect, the disclosure provides an enhanced thermal syphoning system, having a first well and a second well extending though a permeable geological layer, the first well comprising: a first inlet channel to introduce fluid into the well and a first inlet valve to control a first inlet fluid flow rate into the first inlet channel; a second inlet channel sealed to the surrounding geology to introduce a fluid medium into the first well and a second inlet valve to control a second inlet fluid medium flow rate into the second inlet channel, an outlet channel sealed to the surrounding geometry, configured to draw the geologically heated fluid medium from the second inlet channel and an outlet valve to control an outlet fluid medium flow rate, such that the second inlet channel and the outlet channel create a closed heating loop within the first well; and an opening in the first inlet channel adjacent the permeable geological layer; and the second well comprising: a first inlet channel to introduce fluid into the second well and a first inlet valve to control a first inlet fluid flow rate into the first inlet channel; an outlet channel to draw geologically heated fluid from the second well and an outlet valve to control an outlet fluid flow rate from the outlet channel; and an opening in the first inlet channel adjacent the permeable geological layer; wherein the fluid in the first inlet channel of each of the first well and the second well is communicated therebetween via the permeable geological layer, the fluid entering and exiting the first inlet channels through the openings therein, such that each first inlet valve and each outlet valve can be adjusted to vary a flow volume of the fluid between the first well and the second well to thereby control a temperature of the heated fluid drawn from each well.

The second inlet channel of the first well may be coaxially located within the first inlet channel of the first well. The outlet channel of the first well may be coaxially located within the second inlet channel of the first well.

The heated fluid communicated between the first well and the second well may enters the first inlet channel of the first well via the opening therein, heating the fluid medium within the second inlet channel and dissipating thermal energy to the closed heating loop.

In a third aspect, the disclosure provides an enhanced thermal syphoning system, comprising: a first well extending through a permeable geological layer. The first well includes a first pipe inlet configured to receive a fluid at a first inlet mass flow rate and a first inlet temperature. A first pipe outlet is configured to expel the fluid at a first outlet mass flow rate and a first outlet temperature. A first outer wall with at least a portion of the outer wall is defined by the permeable geological layer. The first outer wall defines a first channel between the first outer wall and a first inner casing positioned internal of the first outer wall. The first channel is in fluid communication with the first pipe inlet to receive the fluid. The first outer wall is configured to heat the fluid as the fluid travels axially through the first channel. A portion of the fluid permeates through the first outer wall into the permeable geological layer towards a downstream well. The first inner casing defines a second channel therein. The second channel is in fluid communication with the first channel of the first outer wall to receive the heated the fluid. The first pipe outlet to transmit the heated fluid through the first pipe outlet. A second well extends through a permeable geological layer. The second well includes a second pipe inlet configured to receive a fluid at a second inlet mass flow rate and a second inlet temperature. A second pipe outlet is configured to expel the fluid at a second outlet mass flow rate and a second outlet temperature. A second outer wall includes at least a portion of the outer wall defined by the permeable geological layer. The second outer wall defining a third channel between the second outer wall and a second inner casing positioned internal of the second outer wall. The third channel is in fluid communication with the second pipe inlet to receive the fluid. The second outer wall is configured to heat the fluid as the fluid travels axially through the third channel. A portion of the fluid permeates through the second outer wall from the permeable geological layer. The second inner casing defines a fourth channel therein. The fourth channel is in fluid communication with the third channel of the second outer wall to receive the heated the fluid and the second pipe outlet to transmit the heated fluid through the second pipe outlet.

In some embodiments, the first inlet mass flow rate may be greater than the first outlet mass flow rate and wherein the first outlet temperature is greater than the first inlet temperature; and wherein the second outlet mass flow rate is greater than the second inlet mass flow rate and wherein the second outlet temperature is greater than the second inlet temperature.

In some embodiments, the system may further comprise an open third well positioned between the first well and the second well, the extending through the permeable geological layer, the third well comprising: a third pipe inlet configured to receive a third fluid at a third inlet mass flow rate and a third inlet temperature; a third pipe outlet configured to expel the third fluid at a third outlet mass flow rate and a third outlet temperature; a third outer wall, at least a portion of the third outer wall defined by the permeable geological layer, the third outer wall defining a fifth channel between the third outer wall and a third inner casing positioned internal of the third outer wall, the fifth channel in fluid communication with the third pipe inlet to receive the third fluid, the third outer wall configured to heat the third fluid as the third fluid travels axially through the fifth channel, wherein external first fluid from the first well permeates through the second outer wall from the permeable geological layer, and wherein a portion of the third fluid permeates through the third outer wall into the permeable geological layer towards the second well; and the third inner casing defining a sixth channel therein, the sixth channel in fluid communication with the fifth channel of the third outer wall to receive the heated third fluid and in fluid communication with the third pipe outlet to transmit the heated third fluid through the third pipe outlet.

In some embodiments, the system may further comprise a closed third well positioned between the first well and the second well, the third well comprising: a third pipe inlet configured to receive a third fluid at a third inlet mass flow rate and a third inlet temperature; a third pipe outlet configured to expel the third fluid at a third outlet mass flow rate and a third outlet temperature; a third outer casing, an external portion of the third outer casing positioned within the permeable geological layer, the third outer casing defining a fifth channel between the third outer casing and a third inner casing positioned internal of the third outer casing, the fifth channel in fluid communication with the third pipe inlet to receive the third fluid, the third outer casing configured to heat the third fluid as the third fluid travels axially through the fifth channel, wherein external first fluid from the first well travels around the external portion of the third outer casing positioned within the permeable geological layer toward the second well, wherein the first fluid heats the external portion of the third outer casing thereby heating the third fluid flowing through the fifth channel along an interior side of the external portion; the third inner casing defining a sixth channel therein, the sixth channel in fluid communication with the fifth channel of the third outer casing to receive the heated third fluid and in fluid communication with the third pipe outlet to transmit the heated third fluid through the third pipe outlet.

In some embodiments, the first inlet mass flow rate may be greater than the first outlet mass flow rate. The first outlet temperature may be greater than the first inlet temperature. The second outlet mass flow rate may be greater than the second inlet mass flow rate. The second outlet temperature may greater than the second inlet temperature. The third inlet mass flow rate may be substantially equal to the third outlet mass flow rate. The third outlet temperature may be greater than the third inlet temperature.

In some embodiments of the system, the fluid may be water. In some embodiments of the system, the fluid may be distilled water. In some embodiments of the system, the fluid medium may be distilled water.

Various features, aspects, and advantages of the disclosure will become more apparent from the following description of embodiments of the disclosure, along with the accompanying drawings.

BRIEF DESCRIPTION OF THE DRAWINGS

Exemplary embodiments of the disclosure are described below by way of example only, and not by way of limitation. Referring now to the accompanying drawings in which like numerals indicate like elements throughout the several figures.

Figure 1:
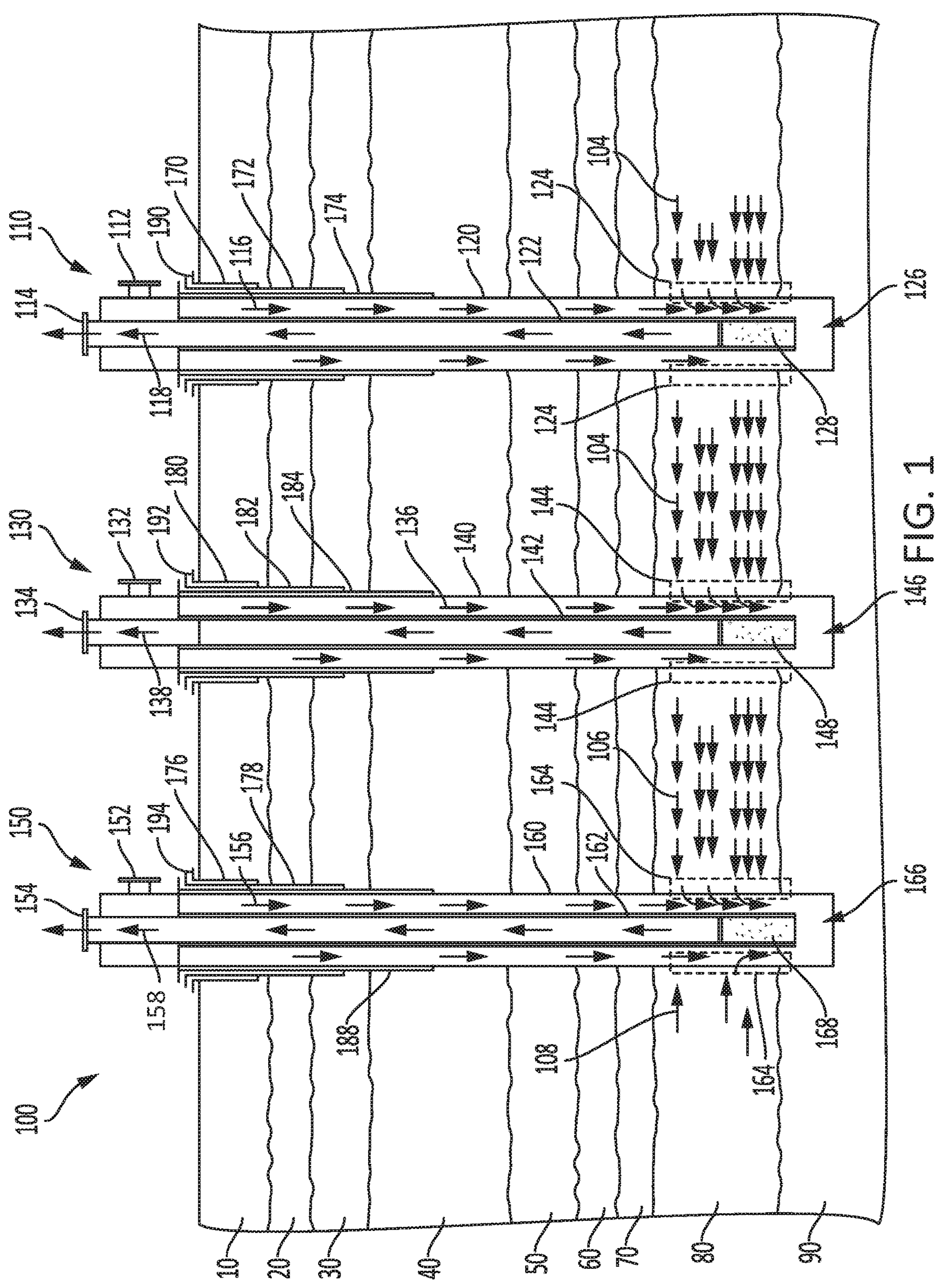
FIG. 1 is a side view of a three well enhanced thermal syphoning energy system, according to an example embodiment.

Embodiments will now be described more fully hereinafter with reference to the accompanying drawings, in which various embodiments, although not the only possible embodiments, of the disclosure are shown. The disclosure may be embodied in many different forms and should not be construed as being limited to the embodiments described below.

DETAILED DESCRIPTION

Referring to the figures generally, a system and method for enhanced thermal syphoning is described. The system can include a plurality of wells that generate water movement along and around the outer casings of a portion of the wells in the plurality of wells to improve a heating effect of the wells and control fluid flow through the wells. The plurality of wells can be configured in a series of adjacent wells (e.g. a first, second, third, fourth, fifth, and last well) or in a series of patterned or nested wells.

In some embodiments, the plurality of wells includes a first injection well having outlets, an end well, and a plurality of wells therebetween. In some arrangements, the first well is an open well configured to allow fluid to flow around the outer casings of a plurality of closed loop wells (e.g. little to no access of the fluid flow to the external environment/outside of the casing) towards and an end well, the end well having slotted inlets. In other arrangements, one or more of the plurality of wells between the first and end well are open wells. In some embodiments, the system is configured such that after 'start-up' pumping, there is little to no further requirement for pumping (e.g. zero to negligible energy input or usage by the system to draw thermal energy from the geology surrounding the well).

Generally, an open well includes a portion of the well that is open to the geology surrounding the well. In some embodiments, the open well configuration includes a well having a slotted portion at the bottom of the outer casing of the well that is in-line with permeable geology such that the fluid within the well can flow in and/or out of the well, through the geology, and downstream to the next well in the series. In other embodiments, the open well configuration can include an outer casing that ends around or terminates within the permeable geology to allow fluid flow in and/or out of the well cavity, through the geology, and downstream to the next well in series. For example, an open well could include a production casing that is configured such that fluid (e.g. water) injected into the well comes into contact with walls of the well defined by the geology and picks up minerals therefrom. The advantage in this configuration is that the direct contact heats up the water more efficiently and can utilise a higher flow rate.

Generally, a closed well includes a closed loop where the fluid medium therein does not get exposed to the geology. In some embodiments the fluid medium can also be water. In some embodiments the fluid medium can be selected for its heat transfer properties as the fluid medium will not contact or leach into the surrounding geology. In the closed well, external fluid flow passes around an outer casing of the well to heat up the fluid medium flowing in the well, which does not pass through the outer casing. In some embodiments, the closed well includes an outer casing (12" to 13⅜") (304 mm to 399 mm) that is surrounding the production casing (e.g. inner casing). This means that the fluid medium to be heated eg. water injected into the closed well does not come into contact with the geology and remains fresh. This arrangement provides advantages for both casing and component life but the water is not heated up as effectively as the open well system.

The first, open well (e.g. the injection well) can be positioned among the plurality of closed loop wells that has the best fluid communication (e.g. flow of fluid around the casings of the closed wells). Further, the injection well is configured such that the outer casing is slotted or otherwise perforated at the bottom in line with the permeable geology so that water can flow out and through the geology. This fluid flow will pass by the closed loop wells of the system towards the end well in the line of wells. The end well is configured to receive some of the fluid flow into the casing of the end well and can be similarly slotted and/or screened to receive the flow of fluid. As will be appreciated, the water quality from the closed loop wells positioned between the injection well and the end well will remain clean and fresh. The water coming from the end well will be contaminated by the geology and will most likely contain salt.

In some embodiments, to ensure minimal fluid losses into the geology, an improved communication between the second well and the first well can be drilled and formed such that a high pressure flow from the second well will flow towards the least line of resistance, which is towards the first drilled well. When a third well is drilled, communication can be created or improved back to the second well and so on. This creates a closed circuit from the first well to the last well.

In some embodiments, the injection well can be a producing well (a well were heated fluid can be drawn), similar to the closed loop wells. In some embodiments, instead of injecting 30 Kg per second as done in the closed loop wells, the injection well may be injected at 50 kg per second into an annulus of the injection well. For example, by restricting the flow out of the production casing at the wellhead of the injection well (first well) to 30 KG/second, then 20 kg/second would be forced into the permeable geology. This forces fluid through the geology to improve the heat transfer to the fluid. The plurality of closed loop wells contain distilled water circulating inside the casing and the injection well and end wells include distilled water with geological contaminates present.

In some embodiments, the end well can be configured to direct flow into a binary power system. Alternatively, the flow can be blended with the total volume of water flowing from the other wells. This would cause a slight contamination of the hot water which would be unlikely to damage a power generator. A small cleaning system can be installed to continuously clean a portion of the total volume of water and as the wells flow for several years, the system can be naturally cleaned up. In some embodiments, the system is a concentric well system.

In one particular embodiment of the enhanced thermal syphoning system, the system is a six well system, with injection flow rates (flow rate into the system) being: Well 1—50 kg/s, Well 2—30 kg/s, Well 3—30 kg/s, Well 4—30 kg/s, Well 5—30 kg/s, Well 6—10 kg/s with the total injected being 180 kg/second. Accordingly, in this embodiment, the production flow rate (flow rate out of the system) can be: Well 1—30 kg/s, Well 2—30 kg/s, Well 4—30 kg/s, Well 5 30 kg/s and Well 6—30 kg/s. Total production flow rate of the embodiment can result in a flow rate 180 kg/second and 116 MW of thermal energy or 24 MW of electricity.

As described in greater detail below, in some arrangements of the enhanced thermal syphoning system, using a 300-degree Celsius or hotter bottom hole geology temperature, the natural flow rate out of a 6.3" insulated production casing at the surface is 30 kg per second at a velocity of 2 meters per second. While the system 100 will experience heat loss on the journey up the well, the outlet temperature will typically be only about 5% less than the water temperature at the bottom of the well.

In other embodiments, drilling and positioning the well(s) at a slightly deeper depth to reach a bottom hole geology temperature of 400-degree Celsius (e.g. about 8,500 m), the pressure of the hot water at the surface is 70 BAR or greater. If the flow rate is not restricted, the outlet temperature will be around 200-degree Celsius (19.35 MW of thermal energy). In some embodiments, if the flow is restricted in the outlet flow to 20 KG per second, the temperature would be 250-degree Celsius (17.2 MW of thermal energy) and if the flow is restricted to 10 KG per second, the temperature will be 300-degree Celsius (10.75 MW of thermal energy). A drop in flow can be responsible for a drop in thermal energy. However, a temperature drop can also occur when the flow is increased because the fluid does not have time to heat up on its journey to the bottom of the well. As such, there is an optimum flow rate, where the flow is not so low, as to decrease the thermal energy output: an optimum flow rate is between 20 and 30 KG per second.

Referring to FIG. 1, an enhanced thermal syphoning system 100 is shown. The enhanced thermal syphoning system 100 includes a three well arrangement with a first well 110, a second well 130, and a third well 150 positioned in series. Each of the first well 110, the second well 130, and the third well 150 are open wells such that the outer casing of each well is open to the outside environment for a portion of the well. Generally, the first well 110 is configured to allow a fluid flow 104 from an end of the first well 110 toward the second well 130 through the permeable geological layer 80. The second well 130 is configured to allow the fluid flow 104 to pass through and around the second well 130 to warm the fluid within the second well and mix with fluid flow 106 moving towards the third well 150. The third well 150 includes a permeable portion to its outer casing that is configured to receive the fluid flow 106.

The thermal syphoning effect is responsible for the movement of fluid in this system once a pump system starts the fluid flow 104. In some embodiments, 50-degree Celsius water (cooled after electricity and water production) is drawn down the wells where the water is heated-up on its journey to the bottom of the well and then pushed to the surface as cooler water enters the well. The fluid is increased in temperature and pressure on exposure to the heated geology of the permeable geological layer, wherein the higher temperatures force the hot fluid (eg. water) up the production casing to the surface of the well.

In some embodiments, the open well configuration includes each well having a slotted portion or perforated portion 124,144,164 located towards a bottom of the well, in-line with the permeable geology, such that the fluid can flow in and/or out of the well, through the geology, and downstream to the next well in the series. In other embodiments, the open well configuration includes an outer casing that ends around or terminates within the permeable geology to allow fluid flow in and/or out of the well cavity, through the geology, and downstream to the next well in series.

Each well 110, 130, 150 in the enhanced thermal syphoning system 100 extends from above ground through the layers towards a permeable layer 80. For example, each well 110, 130, 150 extends through fresh water reservoirs 10, sand stone 20, shale 30, Cenozoic layer 40, Jurassic 50 and lower Jurassic 60 layers, Triasic layer 70, through the Permian layer (e.g., permeable layer) 80 and terminates at a granite/bed rock layer 90.

In some embodiments, one or more of the wells terminate adjacent to or upon entering a substantially non-permeable granite, bed rock layer 90. The fresh water reservoir layer 10 can extend, approximately 100 meters into the ground; the sand stone 20 can extend, approximately 100 meters into (e.g., below) the ground; the shale 30 can begin at, approximately, 1500 meters into the ground; the Cenozoic layer 40 can begin at, approximately, 3000 meters into the ground; the Jurassic layer 50 can begin at, approximately 4000 meters into the ground; the lower Jurassic layer 60 can begin at, approximately, 6500 meters into the ground; the Triasic layer 70 can begin at, approximately, 7000 meters into the ground; the Permian layer (e.g., permeable layer) 80 can begin at, approximately, 7500 meters into the ground; and the granite/bed rock layer 90 can begin at, approximately, 8800 meters into the ground. The depth of the wells 110, 130, 150 into the ground is dependent on the depth of the location of the desired permeable layer that allows for the fluid to flow out of the first well 110 towards and past the other wells in the system 100.

In some embodiments, to ensure that there are no or minimal fluid losses into the geology, the wells can be drilled to improve communication from the downstream well (e.g. second well 130) back to the upstream well (e.g., first well 110). The high-pressure flow from the second well will flow towards the least line of resistance (e.g., towards the first drilled well). When a third well 150 is drilled, communication is configured and created or improved back to the second well 130. Beneficially, the system 100 creates a closed circuit from the first well 110 to the last well 150. In some embodiments, a packer is implemented to seal up a section of the well from say 6,000 meters to 6,500 meters where there might be a layer of permeable geology between layers of hard non-permeable geology. Doing this will create increased fluid communication in the lower and hotter permeable layers 80 than in the upper layers so that the largest percentage of the horizontal flow of fluid is through the hotter geology.

The first well 110 includes a pipe inlet 112, a pipe outlet 114, a first channel 116 (e.g. inlet channel) and a second channel 118 (e.g. outlet channel) disposed within (e.g. concentrically with) the first channel 116. The first channel 116 receives fluid from the pipe inlet 112 and is defined between an outer wall 120 and an inner casing 122 (e.g. production casing) where the outer wall can be formed from a man-made casing and/or defined by the geology of the well. The second channel 118 is defined by the inner casing 122 that is positioned within the outer wall 120. The second channel 118 provides heated fluid to the pipe outlet 114. The well head can include support members 190.

Expanding upon an outer portion of the first well 110, a series of nested outer casings 170, 172, 174 extend downward from the well head and geological surface, toward the open end of the first well 110. The casings 170, 172 are nested such that a third outer casing 174 can be positioned within a second outer casing 172 and a first outer casing 170, and the second outer casing 172 is positioned within the first outer casing 170. In some embodiments, additional or fewer casings can be positioned along the first well 110 in the nested arrangement.

The first outer casing 170 extends from the well head and geological surface inward towards the well end (e.g. into the ground). In some embodiments, the first outer casing 170 extends axially into the ground to a depth of approximately 100 meters. The first outer casing 170 can have a diameter of 30 inches (762 mm). The second outer casing 172 is positioned within, and can abut, the first outer casing 170 and extends from the well head and geological surface inward towards the well end (e.g. into the ground) at a depth greater than the first outer casing 170. In some embodiments, the second outer casing 172 extends axially into the ground to a depth of approximately 1500 meters. The second outer casing 172 can have a diameter of 20 inches (508 mm). The third outer casing 174 is positioned within, and can abut, the second outer casing 172 and extends from the well head and geological surface inward towards the well end (e.g. into the ground) at a depth greater than the second outer casing 172. In some embodiments, the third outer casing 174 extends axially into the ground to a depth of approximately 3000 meters. The third outer casing 174 can have a diameter of 16 inches (406 mm).

The outer wall 120 is positioned with the third outer casing 174 and extends past the third outer casing 174 and defines a bottom of the first well 110. The outer wall 120 is defined by the geological layers such that the fluid is permeable through a permeable portion 124 of the outer wall 120 in the permeable geological layer 80. In some embodiments, the permeable portion 124 of the outer wall 120 is at a depth between 7,500 meters and 9,000 meters. In some embodiments, the outer wall 120 extends axially into the ground to a depth of approximately 8,800 meters. The outer wall 120 may have a diameter of 14.5 inches (368 mm). The permeable portion 124 of the outer wall 120 is configured to allow fluid flow 104 through the permeable layer 80 toward a downstream well, for example, the second well 130 and/or the third well 150.

The inner casing 122 is positioned within the outer wall 120 and is configured to receive the fluid flow from the first channel 116 at an end of the inner casing 122. In some embodiments, the end of the inner casing 122 includes an intake screen 128 and/or intake inlet that receives the fluid flow from the first channel 116 to the second channel 118. The intake screen 128 and the end of the inner casing 122 are spaced from an end of the outer wall 120 end to define a gap 126. The gap 126 is configured for expansion of the fluid. In some embodiments, the gap 126 has a distance between 30 and 50 meters. In some embodiments, the inner casing 122 has a diameter between 5 (127 mm) and 7 inches (177 mm), for example, 6.3 inches (160 mm). In some embodiments, the inner casing 122 is a vacuum insulated casing.

In one embodiment, the pipe inlet 112 of the first well 110 receives a fluid flow of 40 kg/sec (e.g. mass flow rate) at a temperature of 50-degrees Celsius that flows through the first channel 116 towards the bottom of the well 110. The injection velocity through the first channel 116 may be 0.72 m/sec. The fluid is heated as it passes through the lower layers of geology. A portion of the fluid can flow out of the permeable portion 124 of the outer wall 120 towards the second well 130 along a path of the fluid flow 104 in the permeable layer 80. The fluid flow 104 can be 20 kg/sec from the first well 110 toward the second well 130. In some embodiments, fluid from the surrounding geology can enter into the first channel 116 through the permeable portion 124 of the outer wall 120. The fluid enters and may expand within the gap 126 as it enters the intake screen 128 of the inner casing 122 and into the second channel 118. The temperature of the fluid may be approximately 390-degrees Celsius as the fluid travels through the gap 126 toward the second channel 118. The fluid can flow out of the pipe outlet 114 at a fluid flow of 20 kg/sec at a temperature of 260-degrees Celsius from the second channel 118. The first well 110 can provide thermal energy between 15 and 20 MW, for example 18.92 MW.

The second well 130 includes a pipe inlet 132, a pipe outlet 134, a first channel 136 (e.g. inlet channel) and a second channel 138 (e.g. outlet channel) disposed within (e.g. concentrically with) the first channel 136. The first channel 136 receives fluid from the pipe inlet 132 and is defined between an outer wall 140 and an inner casing 142 (e.g. production casing) where the outer wall 140 can be formed from a man-made casing and/or defined by the geology of the well. The second channel 138 is defined by the inner casing 142 that is positioned within the outer wall 140. The second channel 138 provides fluid that has been heated to the pipe outlet 134. The well head can include support members 192.

Expanding upon an outer portion of the second well 130, a nested outer casing extends downward from the well head and geological surface toward the open end of the second well 130. The nested outer casing comprises a first outer casing 180 and a second outer casing 182. The casings 180,182 are nested such that a third outer casing 184 is positioned within the second outer casing 182 and the first outer casing 180, and the second outer casing 182 is positioned within the first outer casing 180. In some embodiments, additional or fewer casings can be positioned along the second well 130 in the nested arrangement.

The first outer casing 180 extends from the well head and geological surface inward towards the well end (e.g. into the ground). In some embodiments, the first outer casing 180 extends axially into the ground to a depth of approximately 100 meters. The first outer casing 180 can have a diameter of 30 inches (762 mm). The second outer casing 182 is positioned within, and can abut, the first outer casing 180 and extends from the well head and geological surface inward towards the well end (e.g. into the ground) at a depth greater than the first outer casing 180. In some embodiments, the second outer casing 182 extends axially into the ground to a depth of approximately 1500 meters. The second outer casing 182 can have a diameter of 20 inches (508 mm). The third outer casing 184 is positioned within, and can abut, the second outer casing 182 and extends from the well head and geological surface inward towards the well end (e.g. into the ground) at a depth greater than the second outer casing 182. In some embodiments, the third outer casing 184 extends axially into the ground to a depth of approximately 3000 meters. The third outer casing 184 may have a diameter of 16 inches (406 mm).

The outer wall 140 is positioned with the third outer casing 184 and extends past the third outer casing 184 and defines a bottom of the second well 130. The outer wall 140 can be defined solely by the geological layers such that the fluid is permeable through a permeable portion 144 of the outer wall 140 in the permeable geological layer 80. In some embodiments, the permeable portion 144 of the outer wall 140 is at a depth between 7,500 meters and 9,000 meters. In some embodiments, the outer wall 140 extends axially into the ground to a depth of approximately 8,800 meters. The outer wall 140 can have a diameter of 15 inches (381 mm). The permeable portion 144 of the outer wall 140 is configured to allow a fluid flow 106 through the permeable geological layer 80 toward a downstream well, for example, the first well 110 and/or the third well 150. In some embodiments, the permeable portion 144 is an outer casing with slotted inlets disposed along the outer wall 140 to allow for fluid flow therethrough.

The inner casing 142 is positioned within the outer wall 140 and is configured to receive the fluid flow from the first channel 136 at an end of the inner casing 142. In some embodiments, the end of the inner casing 142 includes an intake screen 148 and/or intake inlet that receives the flow from the first channel 136 to the second channel 138. The intake screen 148 and the end of the inner casing 142 are spaced from an end of the outer wall 140 to define a gap 146. The gap 146 can be configured for expansion of the fluid. In some embodiments, the gap 146 has a distance between 30 and 50 meters. In some embodiments, the inner casing 142 has a diameter between 5 (127 mm) and 7 inches (177 mm), for example, 6.3 inches (160 mm). In some embodiments, the inner casing 142 is a vacuum insulated casing.

In one embodiment, the pipe inlet 132 of the second well 130 receives a flow of 18 kg/sec at a temperature of 50-degrees Celsius that flows through the first channel 136 towards the bottom of the well 130. The injection velocity through the first channel 136 can be 0.33 m/sec. The fluid is heated as it passes through the lower layers of geology. A portion of the fluid can flow out of the permeable portion 144 of the outer wall 140 toward the second well 130 along a flow path 106 in the permeable layer 80. The fluid flow 106 can be a rate of 14 kg/sec from the second well 130 towards the third well 150. In some embodiments, fluid from the surrounding geology can enter into the first channel 116 of the first well 110 through the permeable portion 124 of the outer wall 120. In some embodiments, fluid from the surrounding geology can enter into the first channel 136 of the second well 130 through the permeable portion 144 of the outer wall 140. The fluid enters and can expand within the gap 146 as it enters the intake screen 148 of the inner casing 142 and into the second channel 138. The temperature of the fluid can be approximately 320-degrees Celsius as the fluid travels through the gap 146 toward the second channel 138. The fluid can flow out of the pipe outlet 134 at a fluid flow rate of 22 kg/sec at a temperature of 290-degrees Celsius from the second channel 138. The second well 130 can have a thermal energy between 20 and 30 MW, for example 23.65 MW.

The third well 150 includes a pipe inlet 152, a pipe outlet 154, a first channel 156 (e.g. inlet channel) and a second channel 158 (e.g. outlet channel) disposed within (e.g. concentrically with) the first channel 156. The first channel 156 receives fluid from the pipe inlet 152 and is defined between an outer wall 160 and the inner casing 162 (e.g. production casing) where the outer wall 160 can be formed from a man-made casing and/or defined by the geology of the well. The second channel 158 is defined by the inner casing 162 that is positioned within the outer casing and/or outer wall 160. The second channel 158 provides fluid that has been heated to the pipe outlet 154. The well head can include support members 194.

Expanding upon an outer portion of the third well 150, a nested outer casing extends downward from the well head and geological surface toward the open end of the third well 150. The nested outer casing comprises a first outer casing 176 and a second outer casing 178. The casings are nested such that a third outer casing 188 is positioned within the second outer casing 178 and the first outer casing 176, and the second outer casing 178 is positioned within the first outer casing 176. In some embodiments, additional or fewer casings can be positioned along the third well 150 in the nested arrangement.

The first outer casing 176 extends from the well head and geological surface inward towards the well end (e.g. into the ground). In some embodiments, the first outer casing 176 extends axially into the ground to a depth of approximately 100 meters. The first outer casing 176 can have a diameter of 30 inches (762 mm). The second outer casing 178 is positioned within, and can abut, the first outer casing 176 and extends from the well head and geological surface inward towards the well end (e.g. into the ground) at a depth greater than the first outer casing 176. In some embodiments, the second outer casing 178 extends axially into the ground to a depth of approximately 1500 meters. The second outer casing 178 can have a diameter of 20 inches (508 mm). The third outer casing 188 is positioned within, and can abut, the second outer casing 178 and extends from the well head and geological surface inward towards the well end (e.g. into the ground) at a depth greater than the second outer casing 178. In some embodiments, the third outer casing 188 extends axially into the ground to a depth of approximately 3000 meters. The third outer casing 188 can have a diameter of 16 inches (406 mm).

The outer wall 160 is positioned with the third outer casing 188 and extends past the third outer casing 188 and defines a bottom of the third well 150. The outer wall 160 is defined by the geological layers such that the fluid is permeable through a portion 164 of the outer wall 160 in the permeable geological layer 80. In some embodiments, the permeable portion 164 of the outer wall 160 is at a depth between 7,500 meters and 9,000 meters. In some embodiments, the outer wall 160 extends axially into the ground to a depth of approximately 8,800 meters. The outer wall 160 can have a diameter of 14.5 inches (368 mm). The permeable portion 164 of the outer wall 160 is configured to allow fluid to flow 108 through the permeable portion 164 toward a downstream well and/or back upstream.

The inner casing 162 is positioned within the outer wall 160 and is configured to receive a fluid flow from the first channel 156 at an end of the inner casing 162. In some embodiments, the end of the inner casing 162 includes an intake screen 168 and/or intake inlet that receives the flow from the first channel 156 to the second channel 158. The intake screen 168 and the end of the inner casing 162 are spaced from an end of the outer wall 160 end to define a gap 166. The gap 166 can be configured for expansion of the fluid. In some embodiments, the gap 166 has a distance between 30 and 50 meters. In some embodiments, the inner casing 162 has a diameter between 5 (127 mm) and 7 inches (177 mm), for example, 6.3 inches (160 mm). In some embodiments, the inner casing 162 is a vacuum insulated casing.

In one embodiment, the pipe inlet 152 of the third well 150 receives a flow of 8 kg/sec at a temperature of 50-degrees Celsius that flows through the first channel 156 towards the bottom of the well. The injection velocity through the first channel 156 can be 0.15 m/sec. The fluid is heated as it passes through the lower layers of geology. In some embodiments, fluid from the surrounding geology can enter into the first channel 116 of the first well 110 through the permeable portion 124 of the outer wall 120. In some embodiments, fluid from the surrounding geology can enter into the first channel 136 of the second well 130 through the permeable portion 144 of the outer wall 140. In some embodiments, fluid from the surrounding geology can enter into the first channel 156 of the third well 150 through the permeable portion 164 of the outer wall 160. The fluid enters and can expand within the gap 166 as it enters the intake screen 168 of the inner casing 162 and into the second channel 158. The temperature of the fluid can be approximately 360-degrees Celsius as the fluid travels through the gap 166 toward the second channel 158. The fluid can flow out of the pipe outlet 154 at 24 kg/sec at a temperature of 340-degrees Celsius from the second channel 158. The third well 150 can have a thermal energy between 20 and 30 MW, for example 27.86 MW.

In some embodiments, the first well 110 and/or the third well 150 can be an injection well to allow fluid flow between the first well and the third well 150 to heat the second well 130, and in some embodiments other wells can be located therebetween. In some embodiments, the enhanced thermal syphoning system 100 has a total production flow substantially similar to the total injection flow. For example, the flow can be between 60 and 70 kg/sec, approximately 66 kg/sec.

Figure 2:
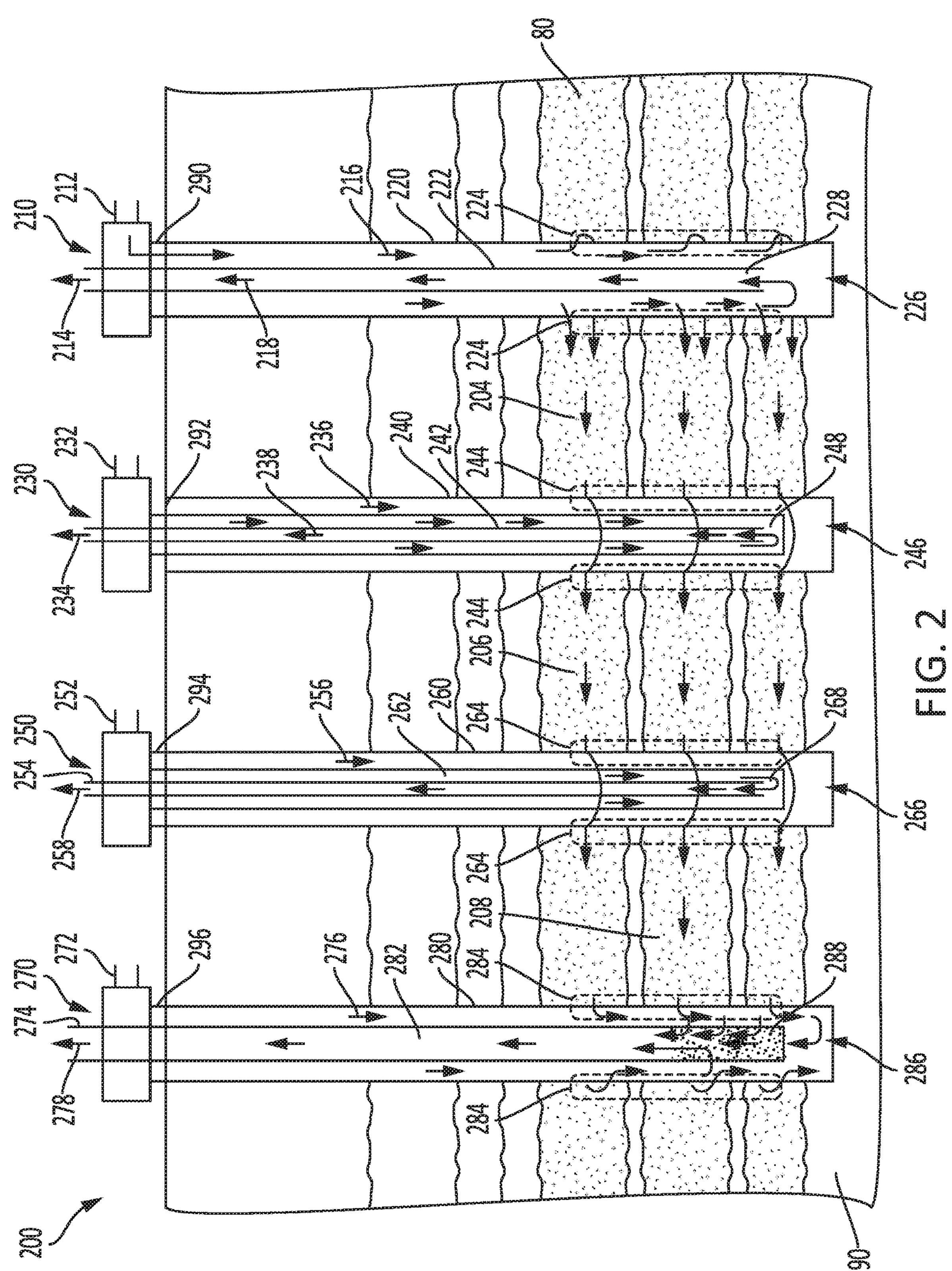
FIG. 2 is a side view of a four well enhanced thermal syphoning energy system, according to another example embodiment.

Referring to FIG. 2, an enhanced thermal syphoning system 200 is shown. The enhanced thermal syphoning system 200 is similar to the enhanced thermal syphoning system 100 of FIG. 1. A difference between the enhanced thermal syphoning system 200 and the enhanced thermal syphoning system 100 is the implementation of a fourth well 270 and a closed loop arrangement for a second well 230 and a third well 250 positioned between an open first well 210 and the open fourth well 270. Accordingly, like numbering is used to designate like parts between the enhanced thermal syphoning system 200 and the enhanced thermal syphoning system 100. For brevity, the description of the enhanced thermal syphoning system 200 will focus on the closed loop arrangement for the second well 230 and the third well 250 positioned between the open first well 210 and the open fourth well 270 is expanded upon.

The enhanced thermal syphoning system 200 comprises a four well arrangement with the first well 210, the second well 230, the third well 250, and the fourth well 270 positioned in series. Each of the first well 210 and the fourth well 270 are open wells such that the outer casing of each well is open to the outside environment for a portion of the well. Each of the second well 230 and the third well 250 are closed wells such that the medium within the wells 230,250 is separated from the outside environment and heated by the flow of the fluid around the second well 230 and the third well 250. The medium within the second and third wells 230, 250 can be water or alternative medium for transporting thermal energy.

Generally, the first well 210 is configured to allow fluid flow 204 from an end of the first well 210 toward the second well 230 through the permeable geological layer 80. The second well 230 is configured to allow the fluid flow 204 to pass around the second well 230 to warm the medium within the second well 230 as fluid flow 206 moves towards the third well 250. The third well 250 is configured to allow the fluid flow 206 to pass around the third well 250 to warm the medium within the third well 250 as fluid flow 206 moves towards the fourth well 250. The fourth well 250 includes an end that is configured to receive the fluid flow 208.

The first well 210 includes a pipe inlet 212, a pipe outlet 214, a first channel 216 (e.g. inlet channel) and a second channel 218 (e.g. outlet channel) disposed within (e.g. concentrically with) the first channel 216. The first channel 216 receives fluid from the pipe inlet 212 and is defined between an outer wall 220 and an inner casing 222 (e.g. production casing) where the outer wall 220 can be formed from a man-made casing and/or defined by the geology of the well. The second channel 218 is defined by the inner casing 222 that is positioned within the outer casing and/or outer wall 220. The second channel 218 provides fluid that has been heated to the pipe outlet 214. The well can include support members 290. For example, the support members 290 can include nested outer casings (not illustrated) that extend downward from the well head and geological surface toward the open end of the first well 210 (e.g. first outer casing, second outer casing, third outer casing, etc. as described herein in relation to the enhanced thermal syphoning system 100 of FIG. 1).

The outer wall 220 extends toward and through the permeable layer 80 and defines a bottom of the first well 210. The outer wall 220 includes a permeable portion 224 that is configured to allow flow of the fluid into the permeable geological layer 80. In some embodiments, the outer wall 220 is substantially all defined by the geological layers. In some embodiments, the permeable portion 224 of the outer wall 220 is at a depth between 7,500 meters and 9,000 meters. In some embodiments, the outer wall 220 extends axially into the ground to a depth of approximately 8,800 meters. The outer wall 220 can have a diameter of 24.5 inches (622 mm). The permeable portion 224 of the outer wall 220 is configured to allow fluid flow 204 through the permeable portion 224 toward a downstream well.

The inner casing 222 is positioned within the outer wall 220 and is configured to receive the fluid flow from the first channel 216 at an end of the inner casing 222. In some embodiments, the end of the inner casing 222 includes an intake inlet 228 and/or intake screen that receives the fluid flow from the first channel 216 to the second channel 218.

The intake inlet 228 and the end of the inner casing 222 are spaced from an end of the outer wall 220 to define a gap 226. The gap 226 can be configured for expansion of the fluid. In some embodiments, the gap 226 has a distance between 30 and 50 meters. In some embodiments, the inner casing 222 has a diameter between 5 (127 mm) and 7 inches (177 mm), for example, 6.3 inches (160 mm).

In one embodiment, the pipe inlet 212 of the first well 210 receives a fluid flow of 30 kg/sec at a temperature of 50-degrees Celsius that flows through the first channel 216 towards the bottom of the pipe. The fluid is heated as it passes through the lower layers of geology. A portion of the fluid can flow out of the permeable portion 224 of the outer wall 220 towards the second well 230 along a flow path 204 in the permeable layer 80. In some embodiments, fluid from the surrounding geology can enter into the first channel 216 through the permeable portion 224 of the outer wall 220. The fluid enters and can expand within the gap 226 as it enters the intake inlet 228 of the inner casing 222 and into the second channel 218. The fluid flows out of the pipe outlet 214 at 10 kg/sec at a temperature of 250-degrees Celsius from the second channel 218. The fluid through the pipe outlet 214 can be slightly salty and/or contaminated by the geology.

The second well 230 includes a pipe inlet 232, a pipe outlet 234, a first channel 236 (e.g. inlet channel) and a second channel 238 (e.g. outlet channel) disposed within (e.g. concentrically with) the first channel 236. The second well 230 is a closed well, such that the medium within the second well 230 is not exposed to the geology. The first channel 236 receives fluid from the pipe inlet 232 and is defined between an outer casing 240 and an inner casing 242 (e.g. production casing). The second channel 238 is defined by the inner casing 242 that is positioned within the outer casing 240. The second channel 238 provides medium that has been heated to the pipe outlet 234. The well can include support members 292. For example, the support members 292 can include nested outer casings that extend downward from the well head and geological surface toward the open end of the second well 230 (e.g. first outer casing, second outer casing, third outer casing, etc. as described herein in relation to FIG. 1).

The outer casing 240 is positioned with a third outer casing and extends past the third outer casing and defines a bottom of the second well 230. Unlike the open first well 210, the outer casing 240 of the second well 230 is closed from the geological surroundings and includes a heating portion 244 that the fluid flow 204 moves around to heat the medium within the outer casing 240. In some embodiments, the heating portion 244 of the outer casing 240 is at a depth between 7,500 meters and 9,000 meters. In some embodiments, the outer casing 240 extends axially into the ground to a depth of approximately 8,800 meters. The outer casing 240 can have a diameter of 25 inches (635 mm). The heating portion 244 of the outer casing 240 is configured to allow fluid flow 204 around the casing, heating the medium therein, and moving into fluid flow 206 to the downstream third well 250.

The inner casing 242 is positioned within the outer casing 240 and is configured to receive the fluid flow from the first channel 236 at an end of the inner casing 242. In some embodiments, the end of the inner casing 242 includes an intake screen and/or intake inlet 248 that receives the flow from the first channel 236 to the second channel 238. The intake inlet 248 and the end of the inner casing 242 are spaced from an end of the outer casing 240 to define a gap 246. The gap 246 can be configured for expansion of the fluid. In some embodiments, the gap 246 has a distance between 30 and 50 meters. In some embodiments, the inner casing 242 is a vacuum insulated casing.

In one embodiment, the pipe inlet 232 of the second well 230 receives a flow of a medium at 20 kg/sec at a temperature of 50-degrees Celsius that flows through the first channel 236 towards the bottom of the well. The medium is heated as it passes through the lower layers of geology. The medium enters and can expand within the gap 246 as it enters the intake inlet 248 of the inner casing 242 and into the second channel 238. The medium flows out of the pipe outlet 234 at a flow rate of 20 kg/sec at a temperature of 250-degrees Celsius from the second channel 238. The medium through the pipe outlet 234 can be untainted by the geology such that the medium entering the pipe inlet 232 is substantially similar in concentration to the medium exiting the pipe outlet 234. The medium can be a distilled fluid, for example, distilled water.

The third well 250 includes a pipe inlet 252, a pipe outlet 254, a first channel 256 (e.g. inlet channel) and a second channel 258 (e.g. outlet channel) disposed within (e.g. concentrically with) the first channel 256. The third well 250 is a closed well, such that the medium within the third well 250 is not exposed to the geology. The first channel 256 receives medium from the pipe inlet 252 and is defined between the outer casing 260 and the inner casing 262 (e.g. production casing). The second channel 258 is defined by the inner casing 262 that is positioned within the outer casing 260. The second channel 258 provides medium that has been heated to the pipe outlet 254. The well can include support members 294. For example, the support members 294 may include nested outer casings that extend downward from the well head and geological surface toward the open end of the third well 250 (e.g. first outer casing, second outer casing, third outer casing, etc. as described herein in relation to FIG. 1).

The outer casing 260 is positioned with a third outer casing and extends past the third outer casing 284 and defines a bottom of the third well 250. Unlike the open first well 210, the outer casing 260 of the third well 250 is closed from the geological surroundings and includes a heating portion 264 that the fluid flow 204 moves around to heat the medium within the outer casing 260. In some embodiments, the heating portion 264 of the outer casing 260 is at a depth between 7,500 meters and 9,000 meters. In some embodiments, the outer casing 260 extends axially into the ground to a depth of approximately 8,800 meters. The outer casing 260 can have a diameter of 25 inches (635 mm). The heating portion 264 of the outer casing 260 is configured to allow fluid flow 206 around the casing 260, heat the medium, and enter fluid flow 208 directed to the downstream fourth well 270.

The inner casing 262 is positioned within the outer well 260 and is configured to receive the flow of medium through the first channel 256 at an end of the inner casing 262. In some embodiments, the end of the inner casing 262 includes an intake screen and/or intake inlet 268 that receives the flow of medium from the first channel 256 to the second channel 258. The intake inlet 268 and the end of the inner casing 262 are spaced from an end of the outer casing 260 to define a gap 266. The gap 266 can be configured for expansion of the medium. In some embodiments, the gap 266 has a distance between 30 and 50 meters. In some embodiments, the inner casing 262 is a vacuum insulated casing.

In one embodiment, the pipe inlet 252 of the third well 250 receives a flow of medium at a rate of 20 kg/sec at a temperature of 50-degrees Celsius that flows through the first channel 256 towards the bottom of the pipe. The medium is heated as it passes through the first channel adjacent the lower layers of geology. The medium enters and can expand within the gap 266 as it enters the intake inlet 268 of the inner casing 262 and into the second channel 258. The medium flows out of the pipe outlet 254 at a flow rate of 20 kg/sec at a temperature of 250-degrees Celsius from the second channel 258. The medium through the pipe outlet 254 is untainted by the geology such that the medium entering into the pipe inlet 252 is substantially similar in concentration to the medium exiting out of the pipe outlet 254. The medium cab be a distilled fluid, for example water.

The fourth well 270 includes a pipe inlet 272, a pipe outlet 274, a first channel 276 (e.g. inlet channel) and a second channel 278 (e.g. outlet channel) disposed within (e.g. concentrically with) the first channel 276. The first channel 276 receives fluid from the pipe inlet 272 and is defined between an outer wall 280 and an inner casing 282 (e.g. production casing) where the outer wall 280 can be formed from a man-made casing and/or defined by the geology of the well. The second channel 278 is defined by the inner casing 282 that is positioned within the outer casing and/or outer wall 280. The second channel 278 provides fluid that has been heated to the pipe outlet 274. The well can include support members 296. For example, the support members 296 may include multiple nested outer casings that extend downward from the well head and geological surface toward the open end of the fourth well 270 (e.g., first outer casing, second outer casing, third outer casing, etc. as described herein in relation to FIG. 1).

The outer wall 280 extends toward and through the permeable layer 80 and defines a bottom of the fourth well 270. The outer wall 280 includes a permeable portion 284 that is configured to allow flow of the fluid into the permeable geological layer 80. In some embodiments, the outer wall 280 is substantially all defined by the geological layers. In some embodiments, the permeable portion 284 of the outer wall 280 is at a depth between 7,500 meters and 9,000 meters. In some embodiments, the outer wall 280 extends axially into the ground to a depth of approximately 8,800 meters. The outer wall 280 may have a diameter of 24.5 inches (622 mm). The permeable portion 284 of the outer wall 280 is configured to allow fluid to flow 204 through the permeable portion 284 toward a downstream/upstream well.

The inner casing 282 is positioned within the outer wall 280 and is configured to receive the flow of the fluid through the first channel 276 at an end of the inner casing 282. In some embodiments, the end of the inner casing 282 includes an intake inlet 288 and/or intake screen that receives the flow from the first channel 276 to the second channel 278. The intake inlet 288 and the end of the inner casing 282 are spaced from an end of the outer wall 280 to define a gap 286. The gap 286 can be configured for expansion of the fluid. In some embodiments, the gap 286 has a distance between 30 and 50 meters. In some embodiments, the inner casing 282 has a diameter between 5 (127 mm) and 7 inches (177 mm), for example, 6.3 inches (160 mm).

In one embodiment, the pipe inlet 272 of the fourth well 270 receives a flow of 10 kg/sec at a temperature of 50-degrees Celsius that flows through the first channel 276 towards the bottom of the well. The fluid is heated as it passes through the lower layers of geology. A portion of the fluid can flow out of the permeable portion 284 of the outer wall 280 towards the third well 250 along a path of fluid flow 208 in the permeable layer 80. In some embodiments, fluid from the surrounding geology can enter into the first channel 276 of the fourth well 270 through the permeable portion 284 of the outer wall 280. The fluid enters and can expand within the gap 286 as it enters the intake inlet 288 of the inner casing 282 and into the second channel 278. The fluid flows out of the pipe outlet 274 at 30 kg/sec at a temperature of 250-degrees Celsius from the second channel 278. The fluid through the pipe outlet 274 can be slightly salty and/or contaminated by the geology.

Figure 3:
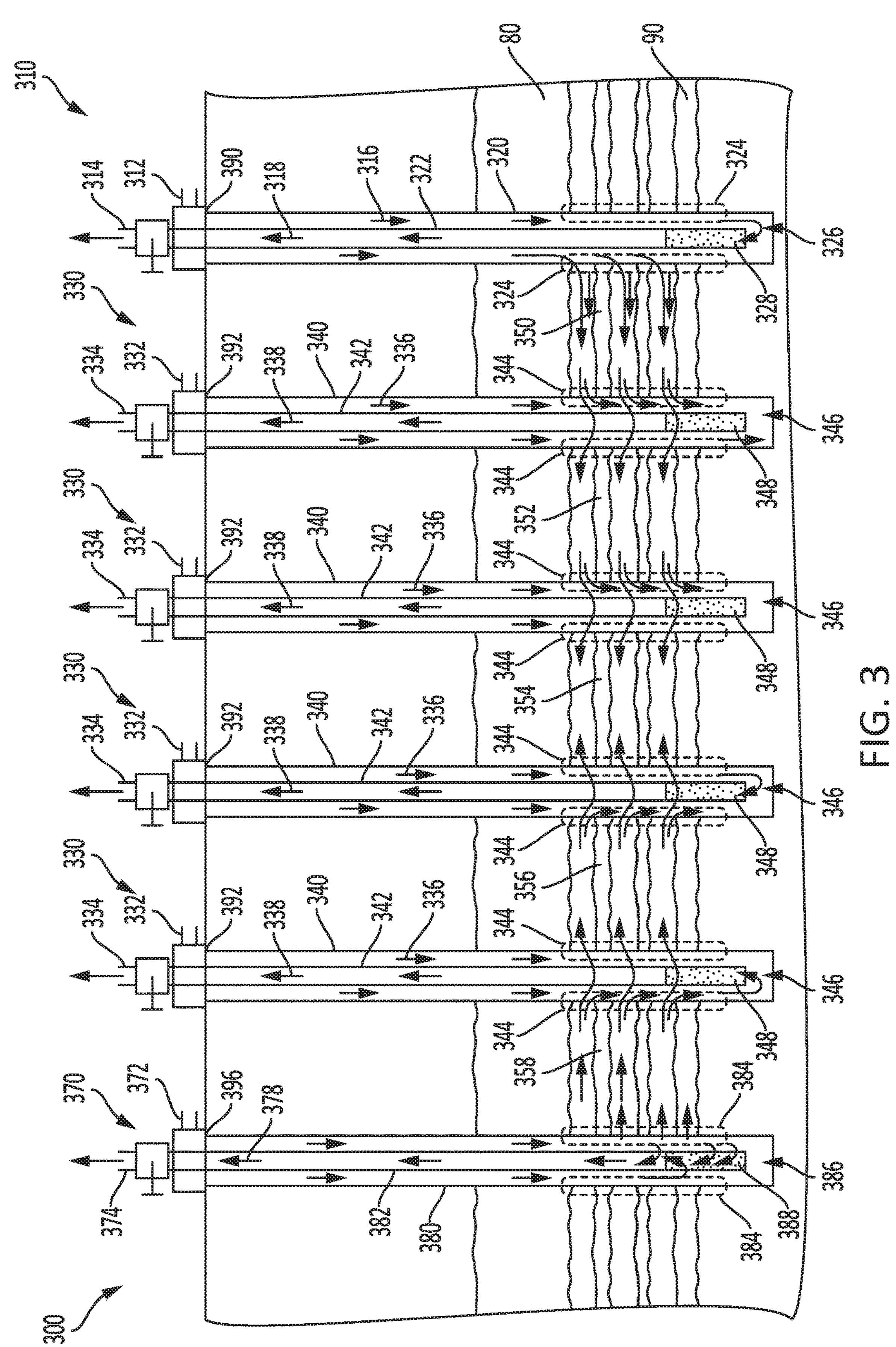
FIG. 3 is a side view of a six well enhanced thermal syphoning energy system, according to an example embodiment.

Referring to FIG. 3, an enhanced thermal syphoning system 300 is shown. The enhanced thermal syphoning system 300 is similar to the enhanced thermal syphoning system 200 of FIG. 2. A difference between the enhanced thermal syphoning system 300 and the enhanced thermal syphoning system 200 is the implementation of four intermediary open wells 330 positioned between the open first well 310 and the open sixth well 370. Accordingly, like numbering is used to designate like parts between the enhanced thermal syphoning system 300 and the enhanced thermal syphoning system 200. For brevity, the description of the enhanced thermal syphoning system 300 will focus on the implementation of multiple intermediary open wells.

The enhanced thermal syphoning system 300 includes a six well arrangement with a first well 310, a plurality of four open intermediary wells 330, and a sixth well 370 positioned in series. Each well 310 is an open well such that the outer casing of each well is open to the outside environment for a portion of the well. In some embodiments, one or more of the intermediary wells may be closed wells such that the fluid within the wells is separate from the outside environment and heated by the flow of the fluid around well casing.

Generally, the first well 310 is configured to allow fluid flow 350 from an end of the first well 310 toward the second well 330 through the permeable geological layer 80. The intermediary wells 330 are configured to allow the fluid flow 350, 352, 354, 356 to pass through and around the intermediary wells 330 to warm the fluid within each intermediary well and flow downstream. The sixth well 370 includes an end that is configured to receive the fluid flow 358.

The first well 310 includes a pipe inlet 312, a pipe outlet 314, a first channel 316 (e.g. inlet channel) and a second channel 318 (e.g. outlet channel) disposed within (e.g. concentrically with) the first channel 316. The first channel 316 receives fluid from the pipe inlet 312 and is defined between an outer wall 320 and an inner casing 322 (e.g. production casing) where the outer wall 320 can be formed from a man-made casing and/or defined by the geology of the well. The second channel 318 is defined by the inner casing 322 that is positioned within the outer casing and/or outer wall 320. The second channel 318 provides fluid that has been heated to the pipe outlet 314. The well may include support members 390. For example, the support members 390 can include a plurality of nested outer casings that extend downward from the well head and geological surface toward the open end of the first well 310 (see FIG. 1).

The outer wall 320 extends toward and through the permeable layer 80 and defines a bottom of the first well 310. The outer wall 320 includes a permeable portion 324 that is configured to allow fluid flow into the permeable geological layer 80. In some embodiments, the outer wall 320 is substantially all defined by the geological layers. In some embodiments, the permeable portion 324 of the outer wall 320 is at a depth between 7,500 meters and 9,000 meters. In some embodiments, the outer wall 320 extends axially into the ground to a depth of approximately 8,800 meters. The outer wall 320 can have a diameter between 10 (254 mm) and 20 inches (508 mm), for example, 13.375 inches (339 mm). The permeable portion 324 of the outer wall 320 is configured to allow fluid flow 350 through the permeable portion 324 toward a downstream well.

The inner casing 322 is positioned within the outer well 320 and is configured to receive the fluid flow from the first channel 316 at an end of the inner casing 322. In some embodiments, the end of the inner casing 322 includes an intake inlet 328 and/or intake screen that receives the flow from the first channel 316 to the second channel 318. The intake inlet 328 and the end of the inner casing 322 are spaced from an end of the outer wall 320 to define a gap 326. The gap 326 can be configured for expansion of the fluid. In some embodiments, the gap 326 has a distance between 30 and 50 meters. In some embodiments, the inner casing 322 has a diameter between 5 (177 mm) and 7 inches (127 mm), for example, 6.3 inches (160 mm).

In one embodiment, the pipe inlet 312 of the first well 310 receives a fluid flow of 20 kg/sec at a temperature of 50-degrees Celsius that flows through the first channel 316 towards the bottom of the well 310. The injection velocity through the first channel 316 can be 1 m/sec. The fluid is heated as it passes through the lower layers of geology. A portion of the fluid can flow out of the permeable portion 324 of the outer wall 320 towards the second well 330 along a fluid flow path 350 in the permeable layer 80. In some embodiments, fluid from the surrounding geology can enter into the first channel 316 through the permeable portion 324 of the outer wall 320. The fluid enters and can expand within the gap 326 as it enters the intake inlet 328 of the inner casing 322 and into the second channel 318. The fluid flows out of the pipe outlet 314 at 10 kg/sec at a temperature of 350-degrees Celsius from the second channel 318. The fluid through the pipe outlet 314 can be slightly salty and/or contaminated by the geology.

Each well in the plurality of intermediary wells 330 includes a pipe inlet 332, a pipe outlet 334, a first channel 336 (e.g. inlet channel) and a second channel 338 (e.g. outlet channel) disposed within (e.g. concentrically with) the first channel 336. The first channel 336 receives fluid from the pipe inlet 332 and is defined between an outer wall 340 and an inner casing 342 (e.g. production casing) where the outer wall 340 can be formed from a man-made casing and/or defined by the geology of the well. The second channel 338 is defined by the inner casing 342 that is positioned within the outer casing and/or outer wall 340. The second channel 338 provides fluid that has been heated to the pipe outlet 334. Each well in the plurality of intermediary wells 330 can include support members 392. For example, the support members 392 can include a plurality of nested outer casings that extend downward from the well head and geological surface toward the open end of each well 330 (e.g. first outer casing, second outer casing, third outer casing, etc. as described herein in relation to FIG. 1).

The outer walls 340 extend toward and through the permeable layer 80 and define a bottom of each well 330 in the plurality of intermediary wells 330. The outer walls 340 are defined by the geological layers such that the fluid is permeable through portions 344 of the outer walls 340 in the permeable geological layer 80. In some embodiments, the permeable portions 344 of the outer walls 340 are at a depth between 7,500 meters and 9,000 meters. In some embodiments, the outer walls 340 extend axially into the ground to a depth of approximately 8,800 meters. The outer walls 340 can have a diameter between 10 inches (254 mm) and 20 inches (508 mm), for example, 13.375 inches (339 mm). The permeable portions 344 of the outer walls 340 are configured to allow fluid flow through the permeable portions 344 toward a downstream subsequent well 310,330, 370.

The inner casing 342 of each well 330 is positioned within the outer well 340 and is configured to receive the fluid flow from the first channel 336 at an end of the inner casing 342. In some embodiments, the end of the inner casing 342 includes an intake screen 348 and/or intake inlet that receives the flow from the first channel 336 to the second channel 338. The intake screen 348 and the end of the inner casing 342 are spaced from an end of the outer wall 340 to define a gap 346. The gap 346 can be configured for expansion of the fluid. In some embodiments, the gap 346 has a distance between 30 and 50 meters. In some embodiments, the inner casing 342 has a diameter between 5 (127 mm) and 7 (177 mm) inches, for example, 6.3 inches (160 mm). In some embodiments, the inner casing 342 is a vacuum insulated casing.

In one embodiment, the pipe inlet 332 of each well 330 in the plurality of intermediary wells receives a flow of 5 kg/sec at a temperature of 50-degrees Celsius that flows through the first channel 336 towards the bottom of the well 330. The injection velocity through the first channel 336 can be 1 m/sec. The fluid is heated as it passes through the lower layers of geology. A portion of the fluid can flow out of the permeable portion 344 of the outer wall 340 toward each well 330 in the plurality of intermediary wells along respective paths of the fluid flows 350, 352, 354, 356, 358 in the permeable layer 80. In some embodiments, fluid from the surrounding geology can enter into the first channel 316 of the first well 310 through the permeable portion 324 of the outer wall 320. In some embodiments, fluid from the surrounding geology may enter into the first channel 336 of an intermediary well 330 through the permeable portion 344 of the outer wall 340. The fluid enters and may expand within the gap 346 as it enters the intake screen 348 of the inner casing 342 and into the second channel 338. The temperature of the fluid can be approximately 320-degrees Celsius as the fluid travels through the gap 346 toward the second channel 338. The fluid can flow out of the pipe outlet 334 at a fluid flow of 10 kg/sec at a temperature of 350-degrees Celsius from the second channel 338.

The sixth well 370 includes a pipe inlet 372, a pipe outlet 374, a first channel 376 (e.g. inlet channel) and a second channel 378 (e.g. outlet channel) disposed within (e.g. concentrically with) the first channel 376. The first channel 376 receives fluid from the pipe inlet 372 and is defined between an outer wall 380 and an inner casing 382 (e.g. production casing) where the outer wall 380 can be formed from a man-made casing and/or defined by the geology of the well. The second channel 378 is defined by the inner casing 382 that is positioned within the outer casing and/or outer wall 380. The second channel 378 provides fluid that has been heated to the pipe outlet 374. The well 370 can include support members 396. For example, the support members 396 can include a plurality of nested outer casings that extend downward from the well head and geological surface toward the open end of the sixth well 370 (e.g. first outer casing, second outer casing, third outer casing, etc. as described herein in relation to FIG. 1).

The outer wall 380 extends toward and through the permeable layer 80 and defines a bottom of the sixth well 370. The outer wall 380 includes a permeable portion 384 that is configured to allow fluid flow into the permeable geological layer 80. In some embodiments, the outer wall 380 is substantially all defined by the geological layers. In some embodiments, the permeable portion 384 of the outer wall 380 is at a depth between 7,500 meters and 9,000 meters. In some embodiments, the outer wall 380 extends axially into the ground to a depth of approximately 8,800 meters. The outer wall 380 can have a diameter between 10 inches (254 mm) and 20 inches (508 mm), for example, 13.375 inches (339 mm). The permeable portion 384 of the outer wall 380 is configured to allow fluid to flow 350 through the permeable portion 384 toward a downstream well.

The inner casing 382 is positioned within the outer wall 380 and is configured to receive the fluid flow from the first channel 376 at an end of the inner casing 382. In some embodiments, the end of the inner casing 382 includes an intake inlet 388 and/or intake screen that receives the flow from the first channel 376 to the second channel 378. The intake inlet 388 and the end of the inner casing 382 are spaced from an end of the outer wall 380 to define a gap 386. The gap 386 can be configured for expansion of the fluid. In some embodiments, the gap 386 has a distance between 30 and 50 meters. In some embodiments, the inner casing 382 has a diameter between 5 and 7 inches, for example, 6.3 inches.

In one embodiment, the pipe inlet 372 of the sixth well 370 receives a flow of 20 kg/sec at a temperature of 50-degrees Celsius that flows through the first channel 376 towards the bottom of the well 370. The fluid is heated as it passes through the lower layers of geology. A portion of the fluid can flow out of the permeable portion 384 of the outer wall 380 towards the second well 330 along a fluid flow path 350 in the permeable layer 80. In some embodiments, fluid from the surrounding geology can enter into the first channel 376 through the permeable portion 384 of the outer wall 380. The fluid enters and can expand within the gap 386 as it enters the intake inlet 388 of the inner casing 382 and into the second channel 378. The fluid flows out of the pipe outlet 374 at 10 kg/sec at a temperature of 350-degrees Celsius from the second channel 378. The fluid through the pipe outlet 374 can be slightly salty and/or contaminated by the geology. In some embodiments, the enhanced thermal syphoning system 300 is configured to allow for a cyclical fluid flow between the first well 310 and the sixth well 370.

Figure 4:
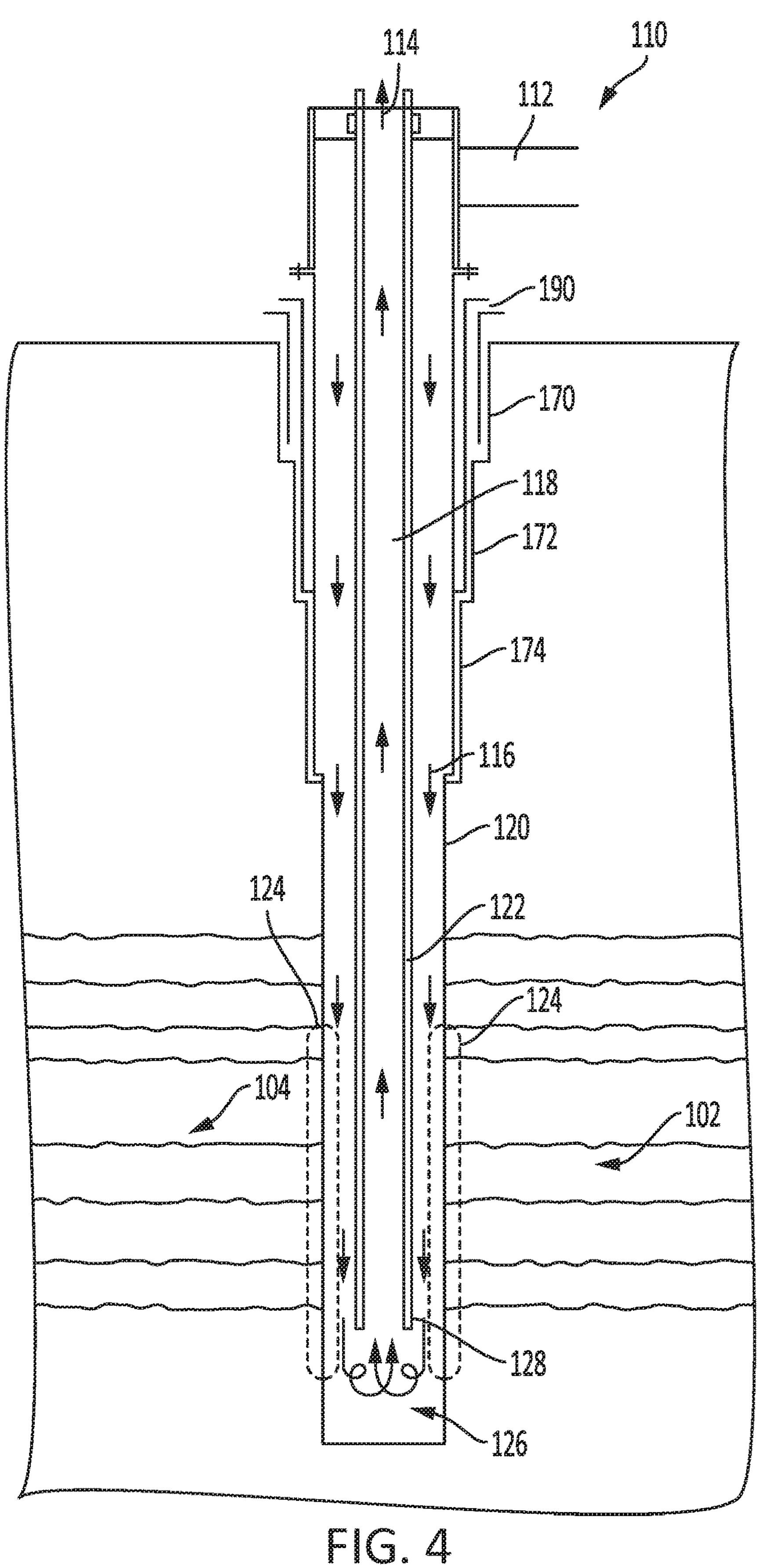
FIG. 4 is a side view of an open well for an enhanced thermal syphoning energy system, according to an example embodiment.
Figure 5:
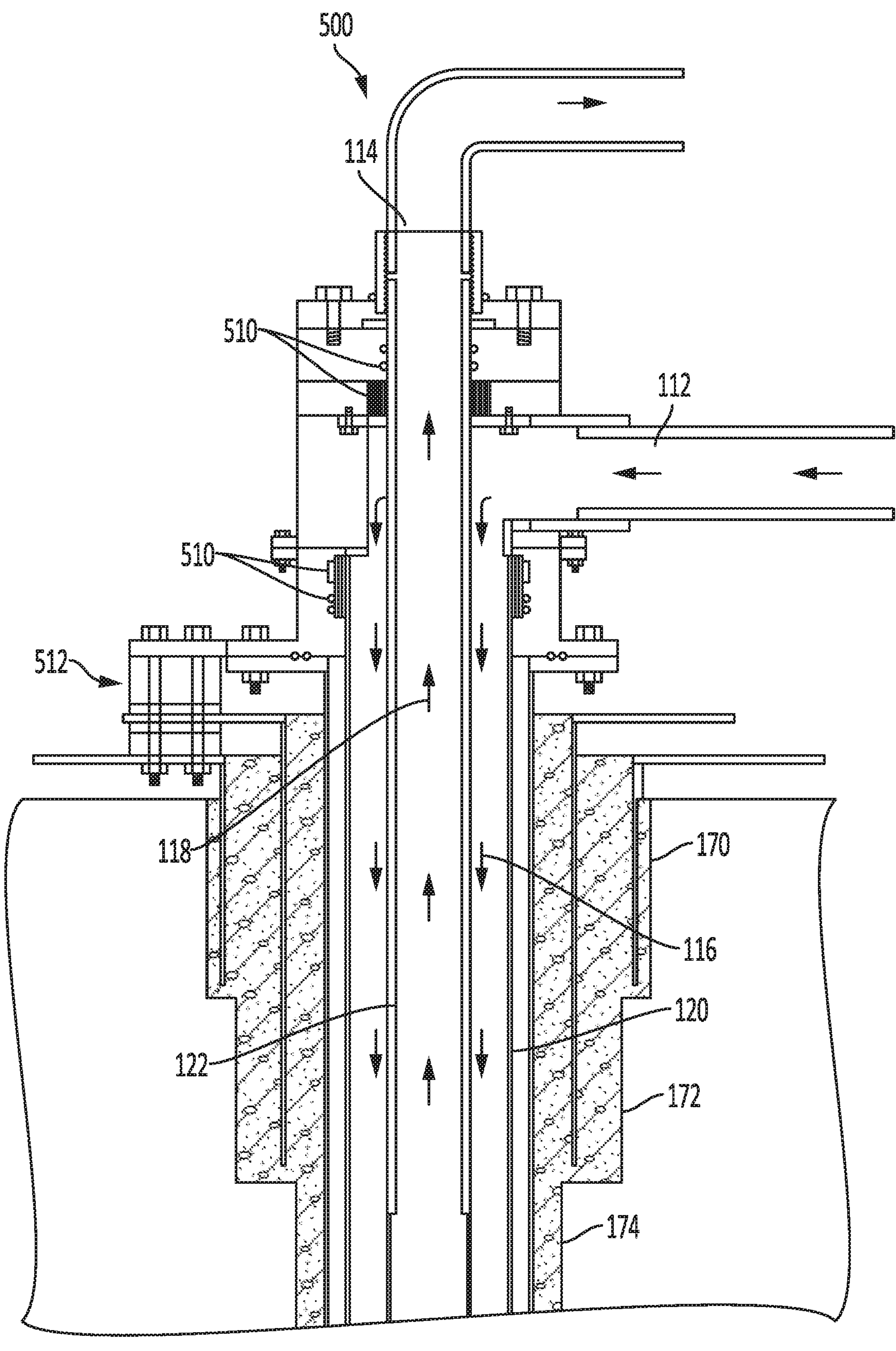
FIG. 5 is a side view of a well head of the open well for the enhanced thermal syphoning energy system of FIG. 4.

An expanded view of the first well 110 (e.g. dual flow well) is shown in FIG. 4. The open well depicted in FIG. 4 can be implemented as an open well in the enhanced thermal syphoning system 100 of FIG. 1, the enhanced thermal syphoning system 200 of FIG. 2, and/or the enhanced thermal syphoning system 300 of FIG. 3. The first well 110 includes a well head 500 as shown in FIG. 5. The well head 500 includes a plurality of seals 510, an exterior support member(s) 512, and other features to provide proper support and outlets for the first well 110.

Figure 6:
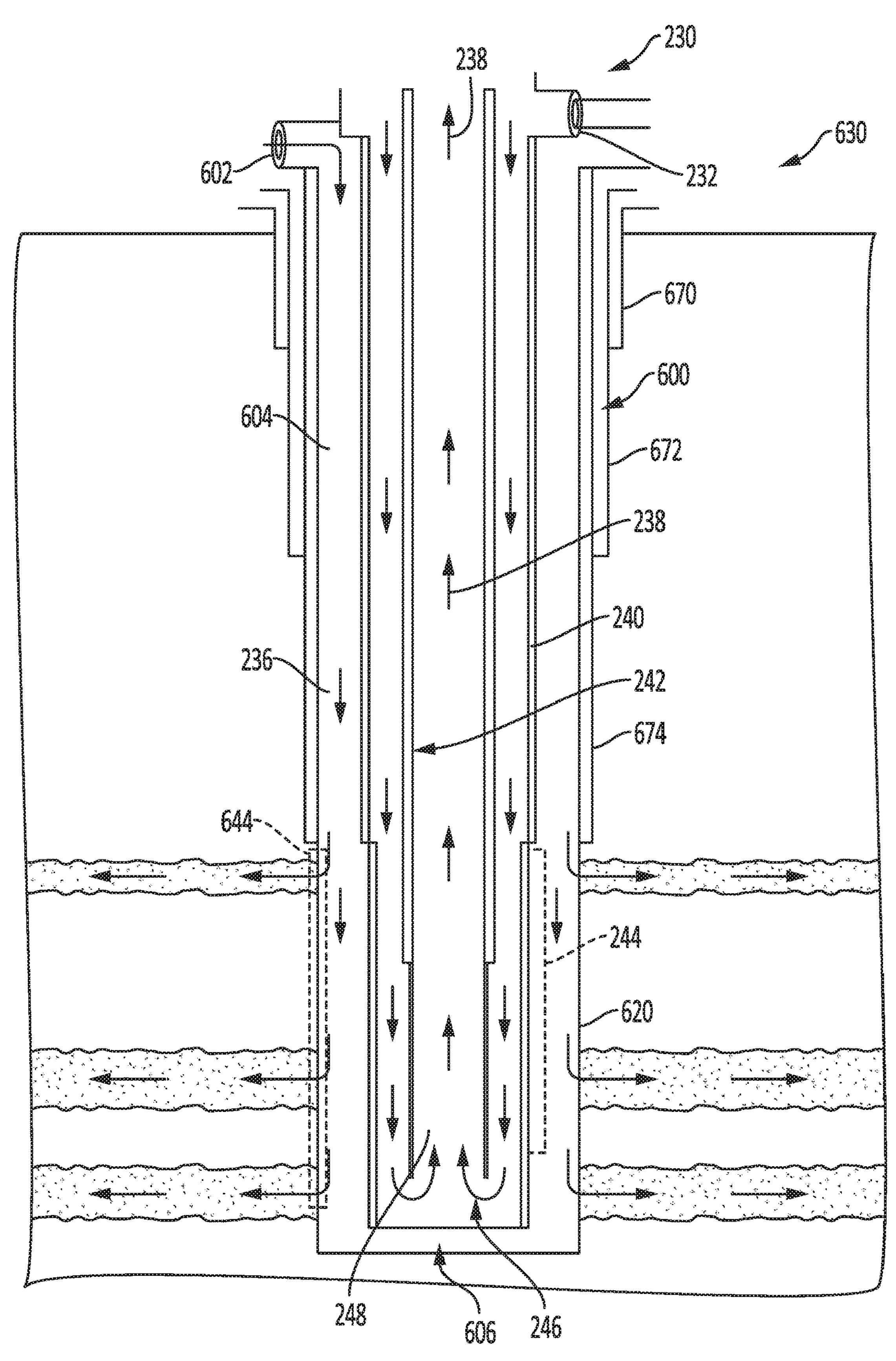
FIG. 6 is a cross-sectional side view of a nested closed well with a closed well and an outer open well portion for an enhanced thermal syphoning energy system, according to another example embodiment.
Figure 7:
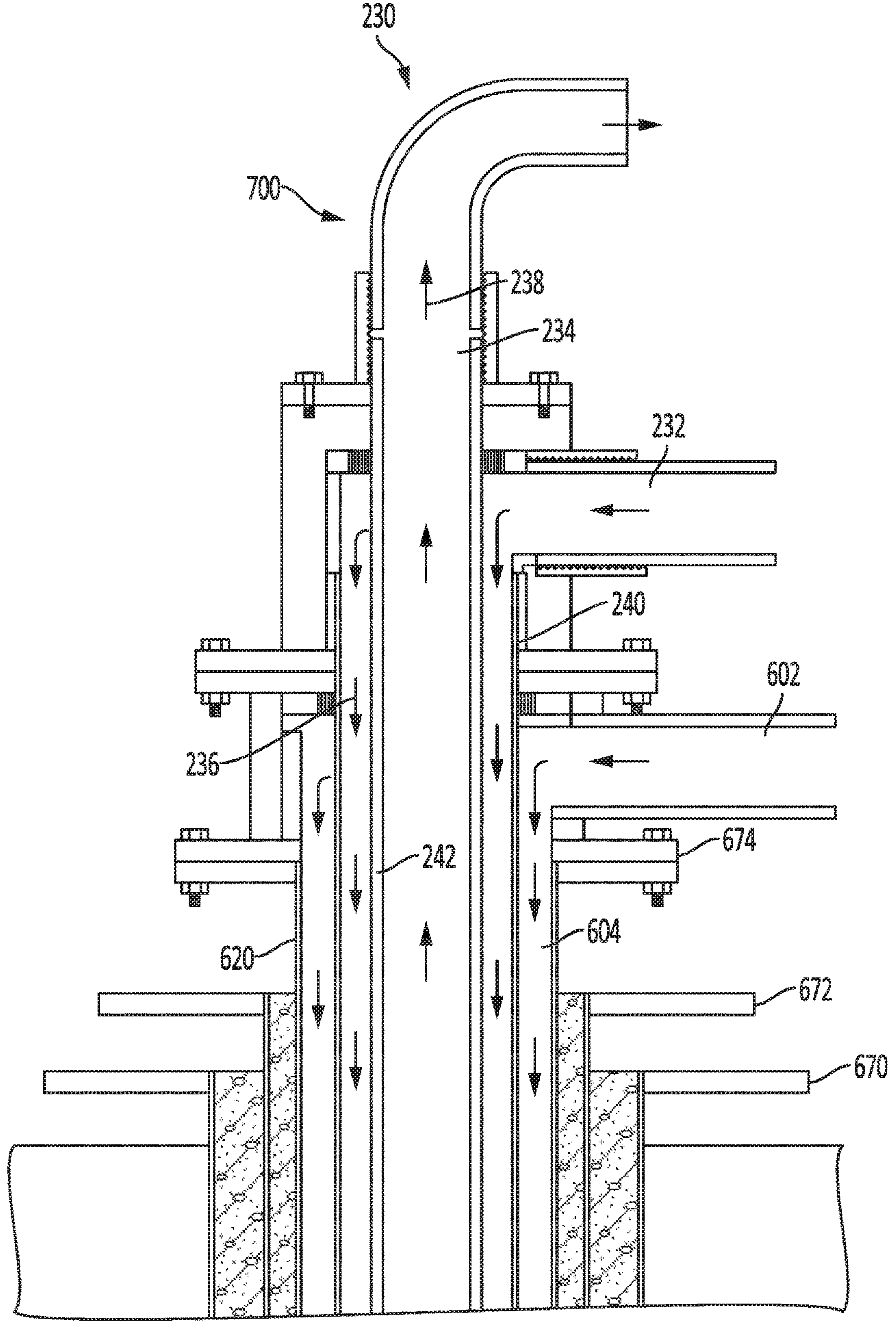
FIG. 7 is a side view of a well head of the nested closed well with the closed well and the outer open well portion of FIG. 6.

Turning to FIGS. 6 and 7, a cross-sectional side view of a nested closed well 630 having a closed inner well 230 and an outer, open well portion 600 (e.g. a triple flow well) and a well head 700 are illustrated. The nested closed well 630 is similar to the open second well 230 of FIG. 2. A difference between the nested closed well 630 and the second well 230 is that the nested closed well 630 includes the outer, open well portion 600. Accordingly, like numbering is used to designate like parts between the nested closed well 630 and the second well 230. For brevity, the description of the nested closed well 630 will focus on the outer open well portion 600 that the closed inner well 230 is nested within.

The outer, open well portion 600 includes an inlet 602, an outer well channel 604 positioned between an outer wall 620 and an outer casing 240 of the closed well 230, and a gap 606 between a bottom of the outer wall 620 and the outer casing 240. The nested outer casing 240 extends downward from the well head 700 and geological surface toward the open end of the outer, open well portion 600. A first outer casing 670 and a second outer casing 672 are configured co axially, such that a third outer casing 674 can be positioned within the second outer casing 672 and the first outer casing 670, wherein the second outer casing 672 is positioned within the first outer casing 670. In some embodiments, additional or fewer casings can be positioned along the nested closed well 630 in the nested arrangement.

The first outer casing 670 extends from the well head and geological surface inward towards the well end (e.g. into the ground). In some embodiments, the first outer casing 670 extends axially into the ground to a depth of approximately 100 meters. The first outer casing 670 can have a diameter of 30 inches (762 mm). The second outer casing 672 is positioned within, and can abut, the first outer casing 670 and extends from the well head and geological surface inward towards the well end (e.g. into the ground) at a depth greater than the first outer casing 670. In some embodiments, the second outer casing 672 extends axially into the ground to a depth of approximately 1500 meters. The second outer casing 672 can have a diameter of 20 inches (508 mm). The third outer casing 674 is positioned within, and can abut, the second outer casing 672 and extends from the well head 700 and geological surface inward towards the well end (e.g. into the ground) at a depth greater than the second outer casing 672. In some embodiments, the third outer casing 674 extends axially into the ground to a depth of approximately 3000 meters. The third outer casing 674 can have a diameter of 16 inches (406 mm).

The outer wall 620 of the outer, open well portion 600 is positioned within the third outer casing 674 and extends past the third outer casing 674 and defines a bottom of the outer, open well portion 600. The outer wall 620 is defined by the geological layers such that the fluid is permeable through a portion 644 of the outer wall 620 in the permeable geological layer 80. In some embodiments, the permeable portion 644 of the outer wall 620 is at a depth between 7,500 meters and 9,000 meters. In some embodiments, the outer wall 620 extends axially into the ground to a depth of approximately 8,800 meters. The outer wall 620 can have a diameter of 14.5 inches (368 mm). The permeable portion 644 of the outer wall 620 is configured to allow the fluid flow 108 through the permeable portion 644 toward a downstream well and/or upstream well.

The enhanced thermal syphoning systems 100, 200, 300 described herein are used to heat water or distilled water to deliver heat or heated water for downstream use. Referring generally to FIG. 1 as an illustrative example, there is a three well system. In order to use the thermal energy in the geology efficiently, each of the wells 110, 130, 150 has an adjustable valve set on the inlet 112, 132, 152 and an adjustable valve set on the outlet 114, 134, 154, to control not only the amount of fluid entering the first channels 116, 136, 136 but also to control the amount of fluid exiting the second channels 118, 138, 158. This provides control over the volume of fluid being forced through the geology 80 between the wells where heat transfer is very efficient. For example, if 30 kg (per second) of fluid is input to the first well 110, but the inlet valve is adjusted such that the first well 110 allows only 10 kg to flow from the outlet 114, then 20 kg is forced down stream to the second well 130. Simultaneously, 20 kg is injected into the second well 130 but only 10 kg is allowed to exit the second well 130 pushing a further 10 kg under pressure into the geology. And finally 10 kg (per second) is injected into the third well 150 allowing 40 kg flow out of the third well 150. In total 60 kg/second of fluid is inputted to the system and 60 kg/second is outputted from the system, but 40 kg/second has been pushed through the geology to thermally heat.

In another variation of the system 100, 40 kg/second of fluid is inputted to the second well 150 and the outlet is closed off completely, forcing 20 kg/second to each of the first 110 and third wells 150. If a further 20 kg is injected into each of the first 110 and third wells 150, then each of the first 110 and third wells 150 will provide a heated fluid output of 40 kg/second. Control on the inlet valves and outlets valves allows infinite adjustments to the inputs and outputs of the system 100 to maximize the thermal heat energy extracted from the system because the horizontal fluid flow can have a greater heat farming effect than the vertical flow into and out of each well 110, 130, 150. This principal also applies to the systems 200 and 300 using 4 and 6 wells respectively. Effectively blocking or limiting the outlet (closing or partially closing the valve on the outlet) to any one or more of the wells in each system 100, 200, 300 will force fluid through the hot geology and out of the remaining open production wells in the system.

The ability to force fluid flow through the geology to more efficiently draw thermal energy from the geology is also complimented by the thermal syphoning effect, wherein the system requires minimal energy input once the thermal syphoning effect has been initiated. The constant input of cooler fluid into the inlet pushes the heated fluid from the outlets and the hotter fluid exiting the outlets draws the cooler fluid into the system to replace the hotter fluid as it is drawn off. This thermal syphoning effect greatly reduces the requirement for additional pumping and thus the energy required to run/sustain the process. It is important to note that the construction and arrangement of the various example embodiments are illustrative only.

Although only a few embodiments have been described in detail in this disclosure, those skilled in the art who review this disclosure will readily appreciate that many modifications are possible (e.g. variations in sizes, dimensions, structures, shapes and proportions of the various elements, values of parameters, mounting arrangements, use of materials, colours, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present disclosure.

As used herein and in the appended claims, the singular form of a word includes the plural, unless the context clearly dictates otherwise. Thus, the references "a," "an" and "the" are generally inclusive of the plurals of the respective terms. For example, reference to "a feature" includes a plurality of such "features." The term "and/or" used in the context of "X and/or Y" should be interpreted as "X," or "Y," or "X and Y.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples). Further, as utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g. within plus or minus five percent of a given angle or other value) are considered to be within the scope of the disclosure as recited in the appended claims. The term "approximately" when used with respect to values means plus or minus five percent of the associated value.

The terms "coupled" and the like as used herein mean the joining of two members directly or indirectly to one another. Such joining may be stationary (e.g. permanent) or moveable (e.g. removable or releasable). Such joining may be achieved with the two members or the two members and any additional intermediate members being integrally formed as a single unitary body with one another or with the two members or the two members and any additional intermediate members being attached to one another.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims.

Without further elaboration, it is believed that one skilled in the art can use the preceding description to utilize the claimed disclosures to their fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated.

It is to be understood that, if any prior art publication is referred to herein, such reference does not constitute an admission that the publication forms a part of the common general knowledge in the art, in Australia or any other country.

In the claims which follow and in the preceding description of the disclosure, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the disclosure.

The invention claimed is:

1. A thermal syphoning system comprising a first well and a second well extending though a permeable geological layer, each well having:

an inlet channel to introduce a fluid into the well and an inlet valve to control an inlet fluid flow rate into the inlet channel;

an outlet channel to draw the fluid when geologically heated fluid from the well and an outlet valve to control an outlet fluid flow rate from the outlet channel; and an opening in the inlet channel adjacent the permeable geological layer, wherein the inlet channel of the first well and the inlet channel of the second well are in fluid communication with each other such that the inlet channels receive heated fluid from each other via the permeable geological layer and through the openings in the inlet channels, wherein each inlet valve and each outlet valve can be adjusted to vary a flow volume of the respective fluid between the first well and the second well to thereby control a temperature of the heated fluid drawn from each well.

2. The system of claim 1, further comprising at least one supplementary well located between the first and the second well, the supplementary well comprising:

an inlet channel to introduce fluid into the supplementary well and an inlet valve to control an inlet fluid flow rate into the inlet channel;

an outlet channel to draw the fluid when geologically heated from the supplementary well and an outlet valve to control an outlet fluid flow rate from the outlet channel; and an opening in the inlet channel, wherein the opening in the inlet channel of the supplementary well is located in the permeable geological layer and configured to receive a portion of the heated fluid communicated between the first well and the second well.

3. The system of claim 1, further comprising at least one supplementary well located between the first and the second well, the supplementary well comprising:

a sealed inlet channel to introduce a fluid medium into the supplementary well and an inlet valve to control an inlet fluid medium flow rate into the inlet channel;

an outlet channel to draw the fluid medium geologically heated from the supplementary well and an outlet valve to control an outlet fluid medium flow rate from the outlet channel, wherein a portion of the inlet channel of the supplementary well is located in the permeable geological layer such that the heated fluid communicated between the first well and the second well flows across the portion of the inlet channel of the supplementary well to dissipate heat to the fluid medium therein.

4. The system of claim 1, wherein the inlet channel of each well is at least partially bounded by a casing.

5. The system of claim 1, wherein the inlet channel of each well is at least partially bounded by a geological wall of the well.

6. The system of claim 1, wherein the outlet channel of each well is cylindrical and co-axially located within a/the casing or geological wall of the inlet channel of the respective well.

7. The system of claim 1, wherein the inlet channel of each well is supported at a surface of each respective well.

8. The system of claim 1, wherein the inlet channel of each well comprises a plurality of concentric nested casings, each subsequent casing extending further into the respective well.

9. The system of claim 1, wherein the inlet channel of each well is longer than the outlet channel of each well to thereby form a gap toward a base of each well.

10. The system of claim 1, wherein the opening of each inlet channel of each well is configured as a permeable portion of the casing.

11. The system of claim 1, wherein each outlet channel of each well comprises an intake screen that filters the fluid flow from the permeable geological layer before the heated fluid enters each of the respective outlet channels.

12. The system of claim 1, wherein a total number of wells in the system comprises between three and ten wells, and wherein the total number of wells are arranged in series.

13. The system of claim 1, wherein the fluid is water.

14. The system of claim 1, wherein the fluid medium is distilled water.

* * * * *